United States Patent
Kim et al.

(10) Patent No.: US 12,159,739 B2
(45) Date of Patent: Dec. 3, 2024

(54) WIRELESS POWER TRANSMISSION APPARATUS COMPRISING SHIELDING MEMBER

(71) Applicant: Samsung Electronics Co., Ltd., Suwon-si (KR)

(72) Inventors: Dongzo Kim, Suwon-si (KR); Mincheol Ha, Suwon-si (KR); Kihyun Kim, Suwon-si (KR); Yunjeong Noh, Suwon-si (KR); Keyic Son, Suwon-si (KR); Taehyeon Yu, Suwon-si (KR); Hyungkoo Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 18/153,049

(22) Filed: Jan. 11, 2023

(65) Prior Publication Data
US 2023/0146752 A1 May 11, 2023

Related U.S. Application Data

(63) Continuation of application No. PCT/KR2021/009320, filed on Jul. 20, 2021.

(30) Foreign Application Priority Data

Sep. 4, 2020 (KR) .......................... 10-2020-0112857

(51) Int. Cl.
*H01F 27/28* (2006.01)
*H01F 27/36* (2006.01)
(Continued)

(52) U.S. Cl.
CPC ..... *H01F 27/2885* (2013.01); *H01F 27/2823* (2013.01); *H01F 27/366* (2020.08);
(Continued)

(58) Field of Classification Search
CPC ............ H01F 27/2804; H01F 27/2823; H01F 27/288; H01F 27/2885; H01F 27/36;
(Continued)

(56) References Cited

U.S. PATENT DOCUMENTS

| | | | | |
|---|---|---|---|---|
| 2012/0049991 A1* | 3/2012 | Baarman | ............... | H02J 50/005 336/199 |
| 2012/0112552 A1* | 5/2012 | Baarman | ............... | B60L 53/126 307/104 |

(Continued)

FOREIGN PATENT DOCUMENTS

| | | |
|---|---|---|
| KR | 10-2017-0018370 A | 2/2017 |
| KR | 10-2018-0037540 A | 4/2018 |

(Continued)

OTHER PUBLICATIONS

International Search Report dated Oct. 26, 2021, issued in an International Application No. PCT /KR2021/009320.

*Primary Examiner* — Levi Gannon
(74) *Attorney, Agent, or Firm* — Jefferson IP Law, LLP

(57) ABSTRACT

A wireless power transmission apparatus is provided. The wireless power transmission apparatus includes a first coil including a first conductive wire area formed of an arrangement of conductive wires, and a first opening area surrounded by the first conductive wire area, a second coil including a second conductive wire area formed of an arrangement of conductive wires, and a second opening area surrounded by the second conductive wire area, a first overlapping area formed by overlapping a portion of the first conductive wire area with a portion of the second opening area, and a first shielding member disposed on at least a portion of the first overlapping area, wherein the first shielding member may be configured to at least partially block an
(Continued)

electromagnetic field generated by the second coil interfering in the first conductive wire area.

19 Claims, 13 Drawing Sheets

(51) Int. Cl.
    *H02J 50/00* (2016.01)
    *H02J 50/10* (2016.01)
    *H02J 50/40* (2016.01)
    *H02J 50/70* (2016.01)

(52) U.S. Cl.
    CPC ............ *H02J 50/005* (2020.01); *H02J 50/10* (2016.02); *H02J 50/402* (2020.01); *H02J 50/70* (2016.02)

(58) Field of Classification Search
    CPC .... H01F 27/363; H01F 27/366; H02J 50/005; H02J 50/10; H02J 50/12; H02J 50/40; H02J 50/402; H02J 50/70
    See application file for complete search history.

(56) References Cited

U.S. PATENT DOCUMENTS

| | | | |
|---|---|---|---|
| 2014/0354223 A1* | 12/2014 | Lee | H02J 50/12 |
| | | | 320/108 |
| 2016/0064814 A1 | 3/2016 | Jang et al. | |
| 2017/0084991 A1 | 3/2017 | Mayo | |
| 2017/0155270 A1 | 6/2017 | Wang | |
| 2018/0090954 A1 | 3/2018 | Graham et al. | |
| 2018/0269716 A1* | 9/2018 | Jang | H02J 50/70 |
| 2019/0272943 A1 | 9/2019 | Leem | |
| 2019/0371515 A1 | 12/2019 | Ha et al. | |
| 2019/0392984 A1 | 12/2019 | Han et al. | |
| 2020/0220389 A1 | 7/2020 | Kwon et al. | |

FOREIGN PATENT DOCUMENTS

| | | |
|---|---|---|
| KR | 10-2018-0046018 A | 5/2018 |
| KR | 10-2018-0055854 A | 5/2018 |
| KR | 10-2018-0077523 A | 7/2018 |
| KR | 10-2019-0138536 A | 12/2019 |
| KR | 10-2019-0143242 A | 12/2019 |
| KR | 10-2020-0046313 A | 5/2020 |
| KR | 10-2020-0073591 A | 6/2020 |
| WO | 2020/035343 A1 | 2/2020 |

* cited by examiner

WIRELESS POWER TRANSMISSION APPARATUS COMPRISING SHIELDING MEMBER

CROSS-REFERENCE TO RELATED APPLICATION(S)

This application is a continuation application, claiming priority under § 365(c), of an International application No. PCT/KR2021/009320, filed on Jul. 20, 2021, which is based on and claims the benefit of a Korean patent application number 10-2020-0112857, filed on Sep. 4, 2020, in the Korean Intellectual Property Office, the disclosure of which is incorporated by reference herein in its entirety.

BACKGROUND

1. Field

The disclosure relates to a wireless power transmission device. More particularly, the disclosure relates to a wireless power transmission device including a shielding member.

2. Description of Related Art

The use of portable electronic devices such as smartphones, tablet personal computers (PCs), and wearable devices has increased, and it has become increasingly common for one user to utilize a plurality of portable electronic devices. When a portable electronic device includes a rechargeable secondary battery, a user is able to use the electronic device for a predetermined period of time even if a separate external power source is not provided. The secondary battery may be recharged through a wired method or a wireless method. The wired charging method requires a cable or charger suitable for the electronic device, which may be cumbersome to carry or store. The wireless charging method may convert electrical energy into electromagnetic waves having a frequency suitable for different electronic devices and may wirelessly transmit the electromagnetic waves the different electronic devices without a transmission line. For example, different electronic devices may be charged by using a single wireless power transmission device (e.g., a charging pad).

Wireless power transmission technology is a method of transmitting power by using an electromagnetic field induced in a coil, in which an electromagnetic field may generated by applying current to a transmission coil and an induced current is formed in a reception coil by the generated electromagnetic field, whereby it is possible to supply electric energy.

The above information is presented as background information only to assist with an understanding of the disclosure. No determination has been made, and no assertion is made, as to whether any of the above might be applicable as prior art with regard to the disclosure.

SUMMARY

When a transmission coil and a reception coil are not properly aligned, power transmission/reception efficiency may be reduced. For example, an electromagnetic field generated in the transmission coil may form induced current in another mechanical structure (e.g., an electrically conductive case, a frame, and/or a housing) of a reception-side electronic device, which may cause a heat generation phenomenon in the reception-side electronic device. In this way, the wirelessly transmitted power may not be utilized for charging, but may be converted into other forms such as thermal energy. In this way, the wirelessly transmitted power may not be utilized for charging, but may be converted into other forms such as thermal energy.

The wireless power transmission device may include a plurality of transmission coils, and may perform power transmission by selecting a transmission coil(s) that are properly aligned with the reception-side electronic device (e.g., a reception coil). For example, when the wireless power transmission device includes a plurality of transmission coils, the reception-side electronic device may be more freely positioned on the wireless power transmission device, power transmission/reception efficiency may be enhanced, and user convenience may also be improved. However, an electromagnetic field generated by a selected transmission coil may be induced to or interfered with another transmission coil. As a result, an electromagnetic field may also be generated in the other unselected transmission coil. An electromagnetic field generated by an unselected transmission coil among the plurality of coils may cause heat generation in an electronic device.

When the wireless power transmission device includes a plurality of transmission coils, the wireless power transmission device may wirelessly transmit power to a plurality of reception-side electronic devices. For example, one of the plurality of transmission coils may wirelessly transmit power to a first external electronic device and another one may wirelessly transmit power to a second external electronic device. However, when the plurality of transmission coils operate at the same time, distortion may occur due to mutual interference of electromagnetic fields, and power transmission/reception efficiency may be reduced, communication performance may be deteriorated, or heat may be generated from the reception-side electronic device(s) due to the distortion caused by the transmission coils.

Aspects of the disclosure are to address at least the above-mentioned problems and/or disadvantages and to provide at least the advantages described below. Accordingly, an aspect of the disclosure is to provide a wireless power transmission device that is improved in power transmission/reception efficiency while wirelessly transmitting power by using at least one of a plurality of coils.

Another aspect of the disclosure is to provide a wireless power transmission device that is capable of suppressing distortion of an electromagnetic field caused due to mutual interference between coils and suppressing heat generation in a reception-side electronic device.

Additional aspects will be set forth in part in the description which follows and, in part, will be apparent from the description, or may be learned by practice of the presented embodiments.

In accordance with an aspect of the disclosure, a wireless power transmission device is provided. The wireless power transmission device includes a first coil including a first conductive wire region configured with an arrangement of a conductive wire and a first opening region surrounded by the first conductive wire region, a second coil including a second conductive wire region configured with an arrangement of a conductive wire, and a second opening region surrounded by the second conductive wire region, a first overlapping region provided as a portion of the first conductive wire region overlaps a portion of the second opening region, and a first shielding member disposed on at least a portion of the first overlapping region. The first shielding member may be configured to at least partially block interference of an electromagnetic field generated by the second coil in the first conductive wire region.

In accordance with another aspect of the disclosure, a wireless power transmission device is provided. The wireless power transmission device includes a plurality of coils including a conductive wire region configured with an arrangement of a conductive wire and an opening region surrounded by the conductive wire region, at least one shielding member disposed in at least a portion of the conductive wire region, and at least one transmission module configured to wirelessly transmit power by using at least one of the coils. The coils may be sequentially disposed along one direction, and the shielding member may be disposed to at least partially overlap the opening region of another adjacent coil.

In accordance with another aspect of the disclosure, a wireless power transmission device is provided. The wireless power transmission device includes a first coil including a first conductive wire region configured with an arrangement of a conductive wire and a first opening region surrounded by the first conductive wire region, a second coil including a second conductive wire region configured with an arrangement of a conductive wire, and a second opening region surrounded by the second conductive wire region, at least one transmission module configured to wirelessly transmit power by using at least one of the first coil and the second coil, a first overlapping region provided as a portion of the first conductive wire region overlaps a portion of the second opening region, a second overlapping region provided as a portion of the second conductive wire region overlaps a portion of the first opening region, and a shielding member disposed in at least one of the first overlapping region and the second overlapping region. The shielding member may be configured to at least partially block an electromagnetic field generated in any one of the first coil and the second coil from being interfered with the other one of the first coil and the second coil.

The wireless power transmission device according to various embodiments disclosed herein includes a plurality of coils, which makes it possible to freely position a reception-side electronic device on the wireless power transmission device, thereby improving user convenience, and to select a coil properly aligned with the reception-side electronic device to transmit power, thereby improving power transmission/reception efficiency. In an embodiment of the disclosure, while wirelessly transmitting power by using at least one of the plurality of coils, the wireless power transmission device includes a shielding member, which makes it possible to reduce or partially block interference between adjacent coils. For example, since the effect of an electromagnetic field generated by a transmission coil on an adjacent coil, it is possible to improve wireless power transmission/reception efficiency. In some embodiments of the disclosure, the wireless power transmission device includes a shielding member positioned in an overlapping region of adjacent coils, which makes it possible to prevent heat from being generated from a reception-side electronic device due to induced current or an electromagnetic field generated from an unselected coil. In addition, various effects recognized directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
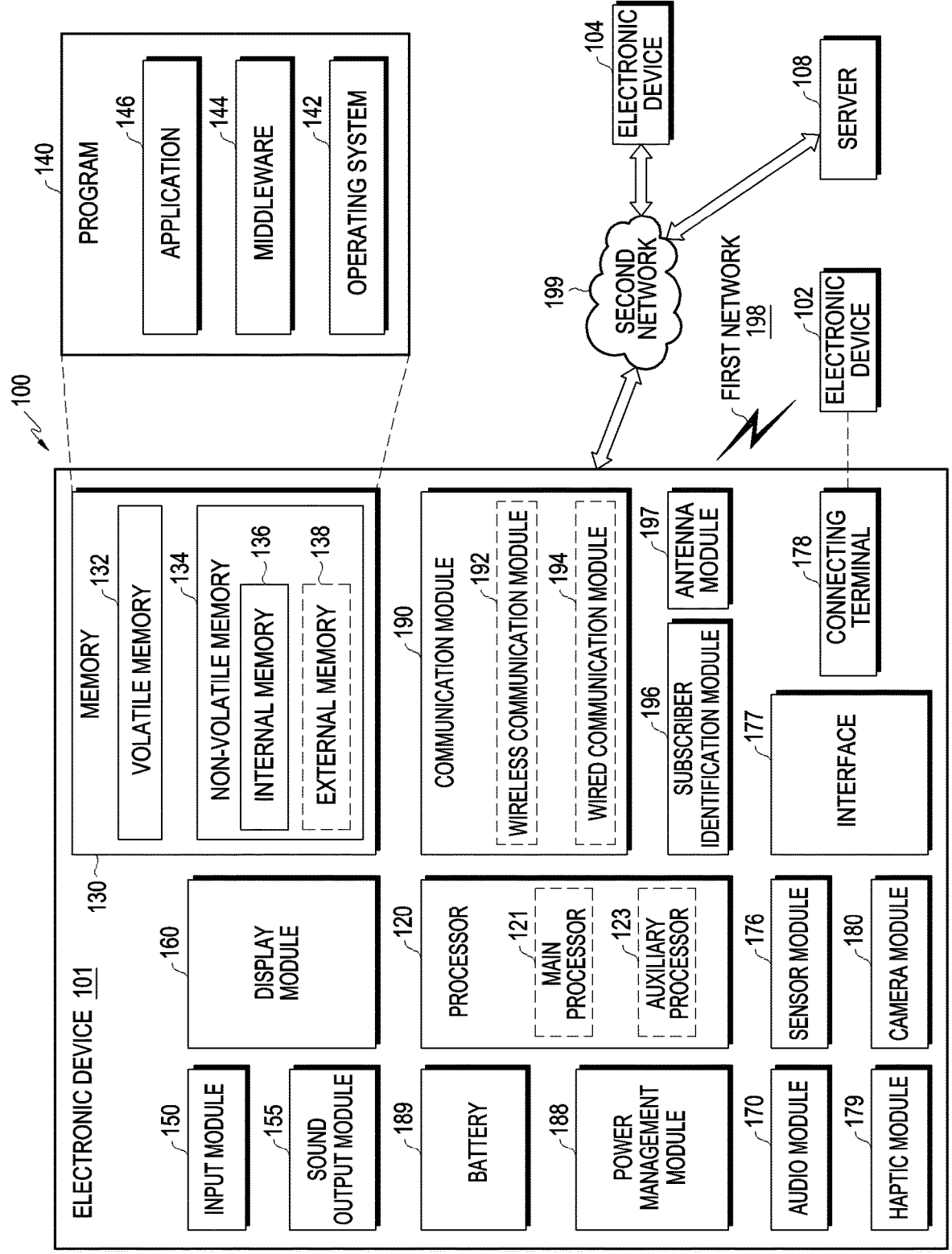
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an external embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
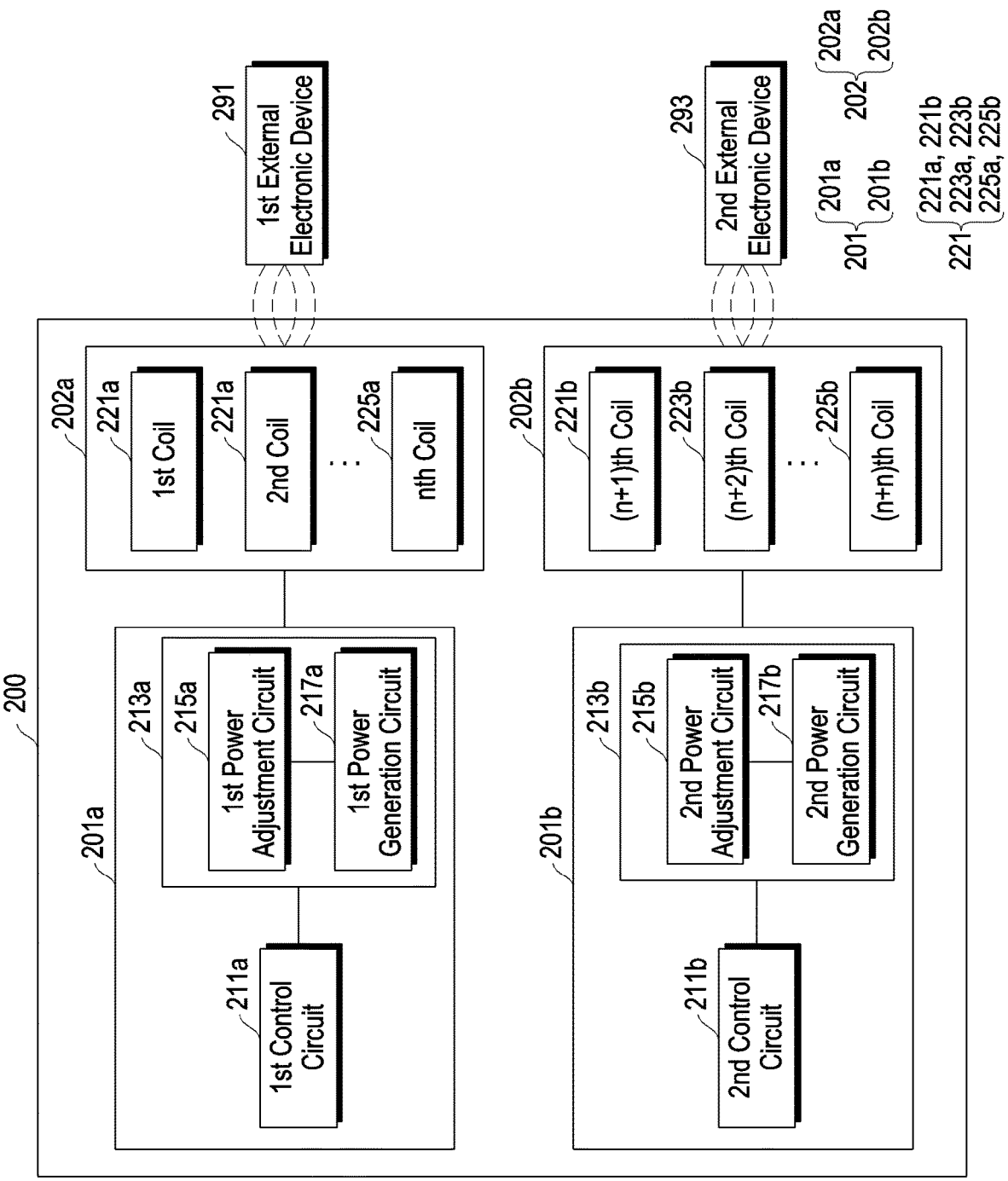
FIG. 2 is a block diagram illustrating a wireless power transmission device according to an embodiment of the disclosure.

FIG. 2 is a block diagram illustrating a wireless power transmission device 200 (e.g., the electronic device 101 in FIG. 1) according to an embodiment of the disclosure.

Referring to FIG. 2, the wireless power transmission device 200 may wirelessly transmit power to each of a first external electronic device 291 (e.g., the external electronic device 102 in FIG. 1) and a second external electronic device 293 (e.g., the external electronic device 102 in FIG. 1), and the first external electronic device 291 and the second external electronic device 293 may wirelessly receive the power.

According to various embodiments of the disclosure, the wireless power transmission device 200 may include a transmission module 201 (201a and 201b) and a coil unit 202 (202a and 202b), and the transmission module 201 may select at least one of a plurality of coils 221 to wirelessly transmit power. For example, the wireless power transmission device 200 may wirelessly transmit power to at least one external electronic device 291 or 293, and when a plurality of external electronic devices 291 and 293 are in the state of being capable of receiving power, the wireless power transmission device 200 may wirelessly transmit power sequentially and/or simultaneously.

According to various embodiments of the disclosure, the transmission module 201 may include a first transmission module 201a and a second transmission module 201b, in which the first transmission module 201a and the second transmission module 201b may operate independently of each other. In the illustrated embodiment of the disclosure, the coil unit 202 may include a first coil unit 202a and a second coil unit 202b, and may generate an electromagnetic field by receiving voltage or current from the transmission module 201. When the external electronic devices 291 and 293 are located within an electromagnetic field generated by the coil unit 202, a reception-side coil (not illustrates) generates an induced current to wirelessly receive power (e.g., charging power) from the wireless power transmission device 200.

According to various embodiments of the disclosure, the first transmission module 201a may include a first control circuit 211a and/or a first power transmission circuit 213a (e.g., a first power adjustment circuit 215a and a first power generation circuit 217a), and may wirelessly transmit power by using at least one of the coils 221a, 223a, and 225a of the first coil unit 202a. The second transmission module 201b may include a second control circuit 211b and/or a second power transmission circuit 213b (e.g., a second power adjustment circuit 215b and a second power generation circuit 217b) and may wirelessly transmit power by using at least one of the coils 221b, 223b, and 225b of the second coil unit 202b. In some embodiments of the disclosure, the first control circuit 211a and the second control circuit 211b may be substantially a single control circuit, and may independently and/or selectively drive the first power transmission circuit 213a and the second power transmission circuit 213b.

According to various embodiments of the disclosure, the coil unit 202 may include a plurality of coils 221 configured to generate an electromagnetic field by receiving voltage and/or current. According to an embodiment of the disclosure, the first coil unit 202a may include some of the coils 221 (e.g., the first coil 221a, the second coil 223a, and/or the $n^{th}$ coil 225a), and may be electrically connected to the first transmission module 201a. For example, the first transmission module 201a may select at least one of the first coil 221a, the second coil 223a, and/or the $n^{th}$ coil 225a to wirelessly transmit power to the first external electronic device 291.

According to various embodiments of the disclosure, the first power transmission circuit 213a may include a first power adjustment circuit 215a and/or a first power generation circuit 217a. In an embodiment of the disclosure, the first power adjustment circuit 215a may provide first voltage (power or current) to the first power generation circuit 217a, and may change the first voltage (power or current) to the first power generation circuit 217a. In some embodiments of the disclosure, the first power generation circuit 217a may generate a first signal having a predetermined frequency (hereinafter, also referred to as a "first frequency") for providing the first power by using the first voltage (power or current) provided from the first power adjustment circuit 215a. In another embodiment of the disclosure, the first power generation circuit 217a may include an inverter (e.g., a bridge circuit) including a plurality of switches, and may generate a first signal for providing the first power through an ON or OFF operation of each of the plurality of switches. According to an embodiment of the disclosure, the first power generation circuit 217a may change the first frequency to another frequency by controlling the ON or OFF operation of each of the plurality of switches.

According to various embodiments of the disclosure, a switch (not illustrated) may be further included between the first power generation circuit 217a and the first coil unit 202a (e.g., a plurality of coils 221a, 223a, and 225a), and at least one coil selected from among the plurality of coils 221a, 223a, and 225a may be connected to the first power generation circuit 217a via the switch. In an embodiment of the disclosure, the first signal generated from the first power generation circuit 217a may be radiated in the form of electromagnetic waves via at least one coil selected from among the plurality of coils 221a, 223a, and 225a. For example, the first transmission module 201a may wirelessly transmit power to the first external electronic device 291 by using at least one coil selected from among the plurality of coils 221a, 223a, and 225a.

According to various embodiments of the disclosure, the second coil unit 202b may include at least some other coils (e.g., a $(n+1)^{th}$ coil 221b, a $(n+2)^{th}$ coil 223b, and/or the $(n+n)^{th}$ coil 225b) among the coils 221, and may be electrically connected to the second transmission module 201b. For example, the second transmission module 201b may select at least one of the $(n+1)^{th}$ coil 221b, the $(n+2)^{th}$ coil 223b, and/or the (n+n)$^{th}$ coil 225b, and may wirelessly transmit power to the second external electronic device 293 via the selected one.

According to various embodiments of the disclosure, the second power transmission circuit 213b may include a second power adjustment circuit 215b and/or a second power generation circuit 217b. In an embodiment of the disclosure, the second power adjustment circuit 215b may provide second voltage (power or current) to the second power generation circuit 217b, and may change the second voltage (power or current) to the second power generation circuit 217b. In some embodiments of the disclosure, the second power generation circuit 217b may generate a second signal having a predetermined frequency (hereinafter, also referred to as a "second frequency") for providing the second power by using the second voltage (power or current) provided from the second power adjustment circuit 215b. In another embodiment of the disclosure, the second power generation circuit 217b may include an inverter (e.g., a bridge circuit) including a plurality of switches, and may generate a second signal for providing the second power through an ON or OFF operation of each of the plurality of switches. According to an embodiment of the disclosure, the second power generation circuit 217b may change the second frequency to another frequency by controlling the ON or OFF operation of each of the plurality of switches.

According to various embodiments of the disclosure, when the first transmission module 201a and the second transmission module 201b perform wireless power transmission at the same time, the first transmission module 201a may wirelessly transmit power via a coil 211 selected by using one of the first the first frequency and the second frequency, and the second transmission module 201b may wirelessly transmit power via another coil 211 selected by using the other one of the first frequency and the second frequency. In an embodiment of the disclosure, when the wireless power transmission device 200 performs wireless power transmission according to a wireless power consortium (WPC) standard, the first frequency and the second frequency may be selected in a range of 110 to 205 kHz. For example, when the first transmission module 201a selects a frequency of 110 to 115 kHz to wirelessly transmit power, the second transmission module 201b may select a frequency of 140 to 145 kHz to wirelessly transmit power.

According to various embodiments of the disclosure, a switch (not illustrated) may be further included between the second power generation circuit 217b and the second coil unit 202b (e.g., a plurality of coils 221b, 223b, and 225b), and at least one coil selected from among the plurality of coils 221b, 223b, and 225b may be connected to the second power generation circuit 217b via the switch. In an embodiment of the disclosure, the second signal generated from the second power generation circuit 217b may be radiated in the form of electromagnetic waves via at least one coil selected from among the plurality of coils 221b, 223b, and 225b. For example, the second transmission module 201b may wirelessly transmit power to the second external electronic device 293 by using at least one coil selected from among the plurality of coils 221b, 223b, and 225b. In some embodiments of the disclosure, the second signal may be a signal having voltage different from that of the first signal while having the same frequency as the first signal, and in other embodiments of the disclosure, the second signal may be a signal having a frequency different from that of the first signal while having the same voltage as the first signal.

According to various embodiments of the disclosure, the control circuits 211a and 211b may control the first power generation circuit 217a to generate the first signal for providing the first power to the first external electronic device 291, and may control the second power generation circuit 217b to generate the second signal for providing the second power to the second external electronic device 293. For example, when power transmission for wireless charging to the first external electronic device 291 is required, the control circuits 211a and 211b may perform control such that the first power adjustment circuit 215a provides the first voltage to the first power generation circuit 217a, may perform control such the first power generation circuit 217a generates the first signal having the first frequency, and may perform control such that the generated first signal is transmitted to the first external electronic device 291 via the first coil unit 202a (e.g., the first coil 221a, the second coil 223a, and/or the n$^{th}$ coil 225a). In another example, when power transmission for wireless charging to the second external electronic device 293 is required, the control circuits 211a and 211b may perform control such that the second power adjustment circuit 215b provides voltage different from the first voltage to the second power generation circuit 217b, may perform control such the second power generation circuit 217b generates the second signal having the first frequency, and may perform control such that the generated second signal is transmitted to the second external electronic device 293 via the second coil unit 202b (e.g., the (n+1)$^{th}$ coil 221b, the (n+2)$^{th}$ coil 223b, and/or the (n+n)$^{th}$ coil 225b). In another example, when power transmission for wireless charging to the second external electronic device 293 is required, the control circuits 211a and 211b may perform control such that the second power adjustment circuit 215b provides the first voltage to the second power generation circuit 217b, may perform control such the second power generation circuit 217b generates the second signal having a frequency different the first frequency, and may perform control such that the generated second signal is transmitted to the second external electronic device 293 via the second coil unit 202b (e.g., the (n+1)$^{th}$ coil 221b, the (n+2)$^{th}$ coil 223b, and/or the (n+n)$^{th}$ coil 225b).

According to various embodiments of the disclosure, in a default state (the state in which power is not transmitted), when one external electronic device is located adjacent and power is transmitted, the transmission frequency of at least one of the first power transmission circuit 213a or the second power transmission circuit 213b may be configured to the first frequency. According to various embodiments of the disclosure, in the default state (the state in which power is not transmitted), when power transmission is requested by each of the plurality of external electronic devices (e.g., the first external electronic device 291 and the second external electronic device 293), the control circuit circuits 211a and 211b may configure the frequency of one of the first power generation circuit 217a or the second power generation circuit 217b to the first frequency and the frequency of the other one to the second frequency. For example, when wirelessly transmitting power to the plurality of external electronic devices at the same time, the first coil unit 202a and the second coil unit 202b may radiate signals of different frequencies.

According to various embodiments of the disclosure, while power is being wirelessly provided to the first external electronic device 291 by using a signal having the first frequency by using the first power generation circuit 217a, when the approach of the second external electronic device 293 is detected, the control circuits 211a and 211b may perform control such that the frequency of the second power generation circuit 217b is configured to the second frequency different from the first frequency and the voltage supplied to the second power generation circuit 217b is configured as voltage corresponding to the second frequency. According to an embodiment of the disclosure, the control circuits 211a and 211b may receive an approach detection signal from a detection unit configured to detecting the approach of the second external electronic device 293.

According to various embodiments of the disclosure, while power being wirelessly provided to the first external electronic device 291 by using a signal having the first frequency by using the first power generation circuit 217a, when the approach of the second external electronic device 293 is detected the control circuits 211a and 211b may configure the frequency of the first power generation circuit 217a to the second frequency different from the first frequency to provide power to the first external electronic device 291 and may configure the frequency of the second power generation circuit 217b to the first frequency to provide power to the second external electronic device 293.

According to various embodiments of the disclosure, while power is being provided to the first external electronic device 291 by using a first signal having the first frequency and second power is being provided to the second external electronic device 293 by using a signal having the second frequency, the control circuits 211a and 211b may perform control such that the first frequency and the second frequency are changed, respectively, based on the charging states of the first external electronic device 291 and the second external electronic device 293.

According to various embodiments of the disclosure, while power is being provided to the first external electronic device 291 by using a signal having the first frequency and power is being provided to the second external electronic device 293 by using a signal having the second frequency, when the charging power charged to the first external electronic device 291 becomes lower than the charging power charged to the second external electronic device 293 (for example, when the first external electronic device 291 is fully charged so that the charging power charged to the first external electronic device 291 becomes lower than the charging power charged to the second external electronic device 293) the control circuits 211a and 211b may change the signal or voltage having the first frequency to a different frequency (e.g., the second frequency) or voltage (e.g., the second voltage) to lower the power provided to the first external electronic device 291. For example, the control circuits 211a and 211b may lower the power provided to the first external electronic device 291 and may provide higher power to the second external electronic device 293.

When high power transmission is requested by one of the first external electronic device 291 and the second external electronic device 293 (e.g., the first external electronic device 291), the control circuits 211a and 211b may configure, for example, of the first power transmission circuit 213a and the second power transmission circuit 213b, one power transmission circuit for providing high power to the first external device 291 (e.g., the first power transmission circuit 213a) to generate a signal having the first frequency for high power transmission and the other power transmission circuit (e.g., the second power transmission circuit 213b) to generate a signal having a frequency that is capable of transmitting lower power than the signal having the first frequency.

According to various embodiments of the disclosure, when power transmission is requested by a device other than the first external electronic device 291 and the second external electronic device 293 (e.g., a third external electronic device 395 in FIG. 3), the control circuits 211a and 211b may configure a third power transmission circuit to generate a signal having a third frequency. For example, the signal having the third frequency may use a third frequency and/or third voltage capable of providing power without interfering with the signal having the first frequency signal and/or the signal having the second frequency. For example, the third frequency may be a frequency different from the first frequency and/or the second frequency, and may have voltage different from the voltage of the first frequency and/or the second frequency. In an embodiment of the disclosure, signals having the first to third frequencies may be the signals having different voltages while having the same frequency. In another embodiment of the disclosure, the signals having the first to third frequencies may be signals having different frequencies while having the same voltage.

According to various embodiments of the disclosure, by providing power from the wireless power transmission device 200 (e.g., the electronic device 101 in FIG. 1) to a plurality of external electronic devices (e.g., the external electronic devices 102 and 104 of FIG. 1) by using different or non-adjacent frequency bands, it is possible to increase H-field strength or to suppress electromagnetic interference (EMI), radiated emission (RE), or conducted emission (CE). In some embodiments of the disclosure, while power is being provided to the first external electronic device 291 by using the first frequency, when the second external electronic device 293 approaches, the wireless power transmission device 200 may prevent interference between the signal of the first frequency provided by to the first external electronic device 291 and the signal of the second frequency provided to the second electronic device 293 by providing power to the second external electronic device 293 by using the second frequency different from the first frequency. In another embodiment of the disclosure, while power is being provided to the first external electronic device 291 by using the first frequency and power is being provided to the second external electronic device 293 by using the second frequency, the wireless power transmission device 200 may adjust the magnitude of power provided to each of the first external electronic device 291 and the second external electronic device 293 depending on the charging states of the first external electronic device 291 and the second external electronic device 293 by changing the first frequency and the second frequency based on the charging states of the first external electronic device 291 and the second external electronic device 293. In another embodiment of the disclosure, when the power provided to the first external electronic device 291 and the power provided to the second external electronic device 293 are different from each other, the wireless power transmission device 200 may improve power transmission efficiency by configuring the frequency of a signal transmitted to a side that requires high power, to a lower frequency.

The above-described embodiment has exemplified the configuration in which the first coil unit 202a is electrically connected to the first transmission module 201a, and the second coil unit 202b is electrically connected to the second transmission module 201b. However, it is noted that various embodiments of the disclosure are not limited thereto. For example, one transmission module 201 may be electrically connected to a plurality of coils 221, and the transmission module 201 may wirelessly transmit power by using a signal of the first frequency by using at least one coil selected from among the plurality of coils 221, and may wirelessly transmit power by using a signal of the second frequency by using at least one other coil selected from among the plurality of coils 221. In another embodiment of the disclosure, the wireless power transmission device 200 may include the sensor module 176, the communication module 190, and/or the antenna module 197 of FIG. 1, thereby detecting the approach of the external electronic devices 291 and 293 or receiving a wireless power transmission request from the external electronic devices 291 and 293.

In describing various embodiments below, reference may be made to the external electronic devices 101, 102, and 104 of FIG. 1 and/or the wireless power transmission device 200 of FIG. 2.

Figure 3:
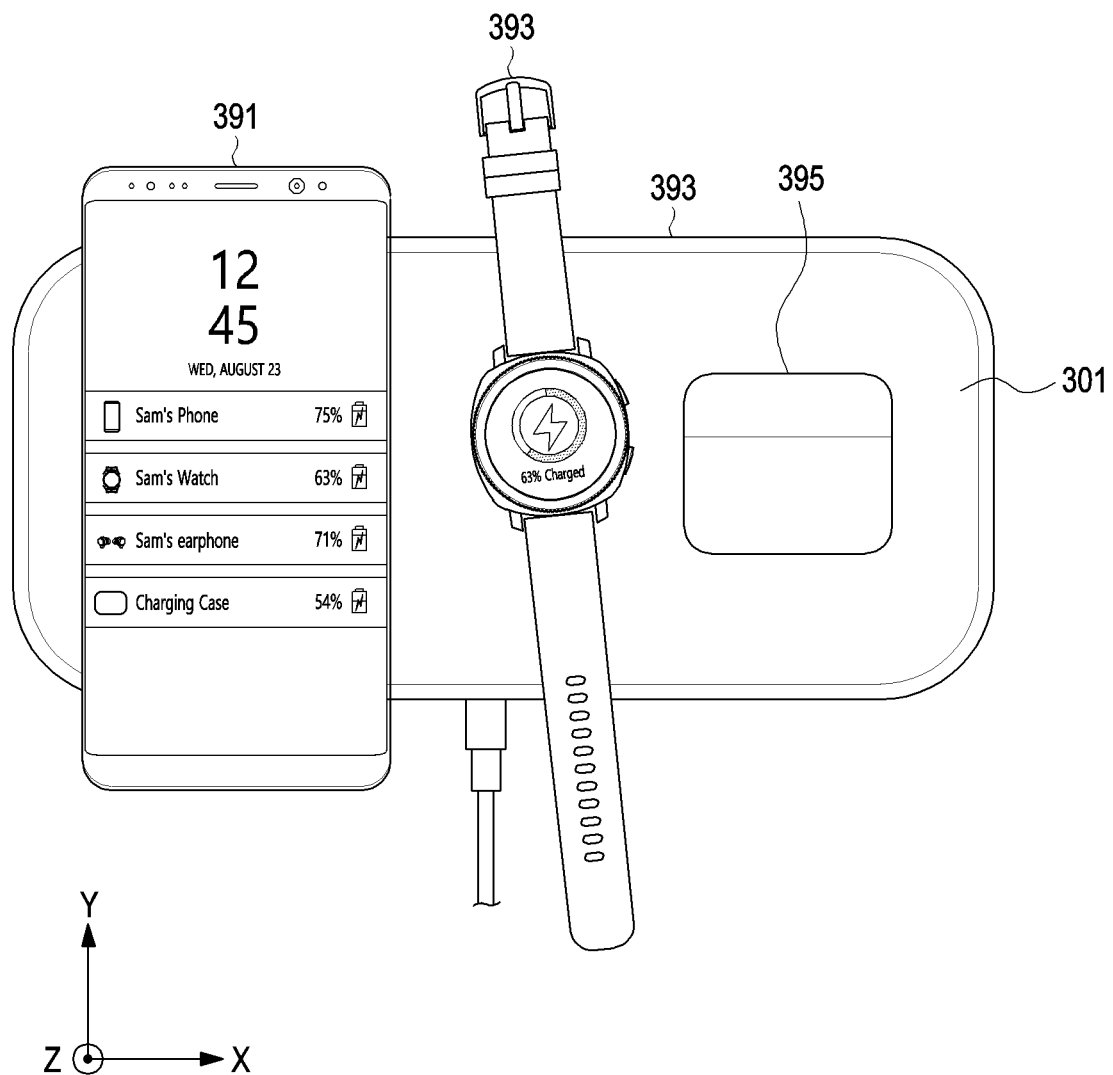
FIG. 3 is a plan view illustrating a state in which external electronic devices are placed on a wireless power transmission device according to an embodiment of the disclosure.

FIG. 3 is a plan view illustrating the state in which external electronic devices 391, 393, and 395 are placed on a wireless power transmission device 300 (e.g., the electronic device 101 of FIG. 1 and/or the wireless power transmission device 200 of FIG. 2) according to an embodiment of the disclosure.

Referring to FIG. 3, the wireless power transmission device 300 may be a charging pad on which one or more external electronic devices 391, 393, and 395 may be placed on the top surface of the housing 301 thereof. In some embodiments of the disclosure, the housing 301 may indicate positions suitable for wireless charging by including various patterns or figures printed or engraved on the top surface thereof. For example, prints or patters may be provided at positions at each of which a reception-side electronic device (e.g., the external electronic device 391, 393, or 395) may be properly aligned with one of the coils of the wireless power transmission device 300 (e.g., the coils 221 of FIG. 2) when the electronic device is placed on the 301, and based on the prints or patterns, a user may visually or tactilely recognize the placement positions for the devices (e.g., the external electronic devices 391, 393, and 395) to be charged. In another embodiment of the disclosure, the wireless power transmission device 300 may include a housing 301 free of a print or pattern for position identification. In this case, the wireless power transmission device 300 may select a coil (e.g., the coils 221 of FIG. 2) that is properly aligned with an external electronic device 391, 393, or 395 to wirelessly transmit power. The external electronic devices 391, 393, and 395 may include, for example, a smartphone, a wearable electronic device, a wireless earphone charging case, and/or a wireless charging battery pack. The wireless power transmission device 300 may receive external power via a wire, may convert the power into a signal suitable for reception by an external electronic device 391, 393, or 395, and may radiate the signal to the outside.

According to various embodiments of the disclosure, the wireless power transmission device 300 may include a plurality of coils (e.g., the coils 221 of FIG. 2), thereby wirelessly transmitting power to the external electronic devices 391, 393, and 395 by using one or more coils selected according to the positions at which the external electronic devices 391, 393, and 395 are placed. For example, even if a user places an external electronic device 391, 393, or 395 at any position, the wireless power transmission device 300 may select a coil located closest to and/or aligned best with the placed external electronic device 391, 393, or 395 to transmit power, which makes it possible to enhance wireless power transmission efficiency. The structure and arrangement of the coils 221 will be described with further reference to FIGS. 4 and 5.

Figure 4:
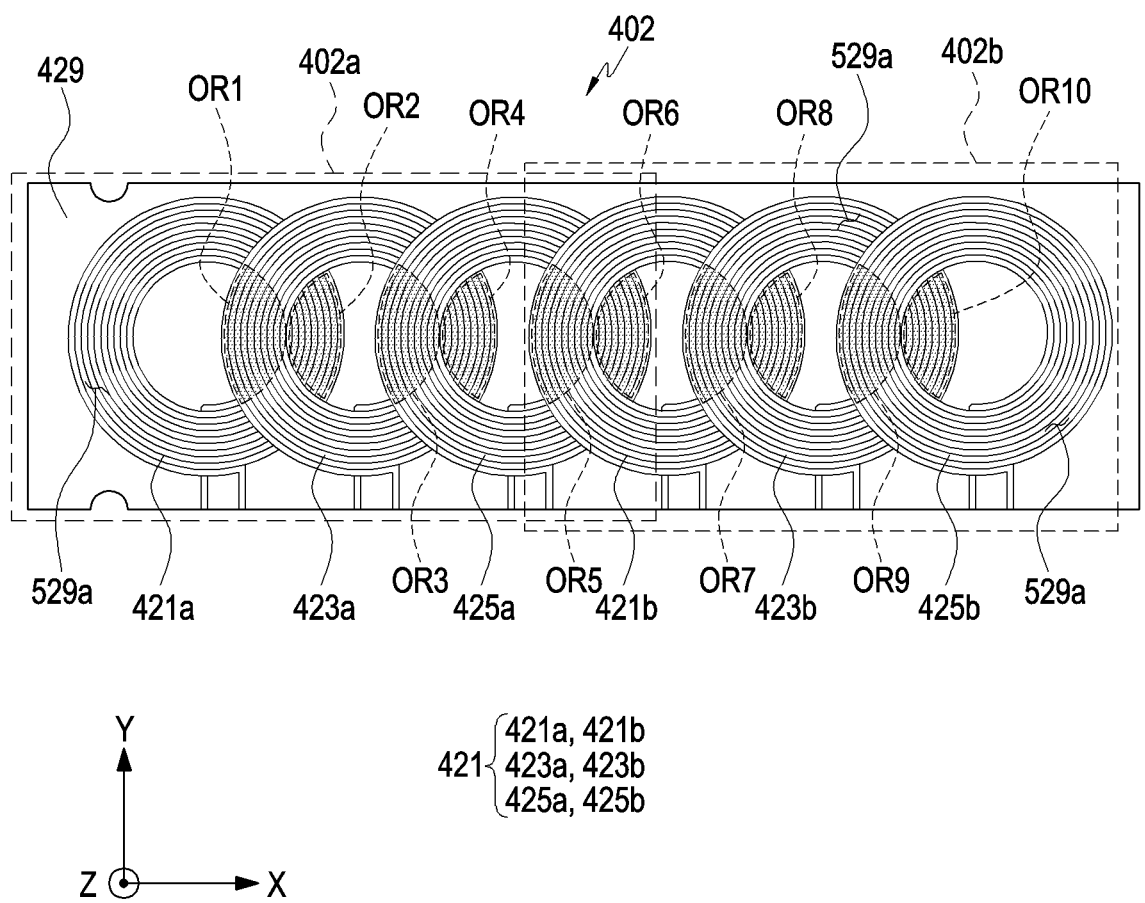
FIG. 4 is a plan view illustrating a state in which coils are arranged in a coil unit of a wireless power transmission device according to an embodiment of the disclosure.

FIG. 4 is a plan view illustrating the state in which coils 421 (e.g., the coils 221 of FIG. 2) are arranged in a coil unit 402 of a wireless power transmission device (e.g., the wireless power transmission device 200 or 300 of FIG. 2 or 3) according to an embodiment of the disclosure.

Figure 5:
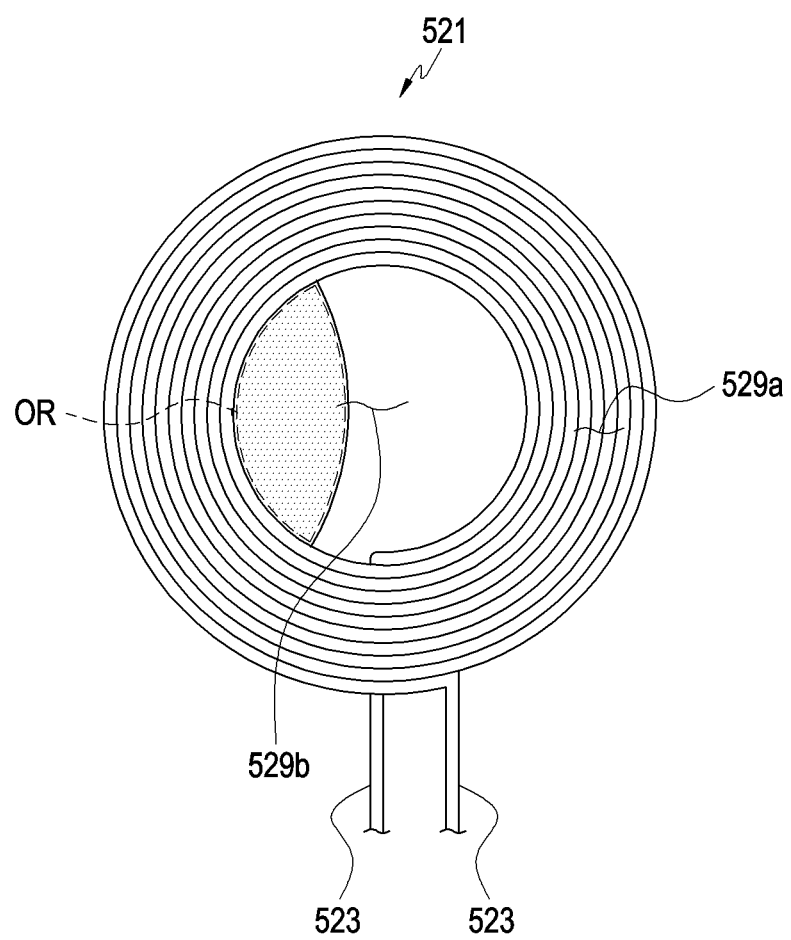
FIG. 5 is a plan view illustrating a coil of a wireless power transmission device according to an embodiment of the disclosure.

FIG. 5 is a plan view illustrating a coil 521 (e.g., an arbitrarily selected one of the coils 221 of FIG. 2) of a wireless power transmission device according to an embodiment of the disclosure.

Referring to FIGS. 4 and 5, the coils 421 and 521 may each include a conductive wire region 529a configured with an arrangement of conductive wire and an opening region 529b surrounded by the conductive wire region 529a. For example, the conductive wire of each of the coils 421 and 521 is arranged in a spiral shape in which different portions of the wire are located adjacent to each other, and the opening region 529b may be a region in which the conductive wire is not arranged and which is surrounded by the conductive wire region 529b. In an embodiment of the disclosure, each coil 521 or 421 may have a substantially flat plate shape, and may be disposed on a housing (e.g., housing 301 of FIG. 3) obliquely or in a partially bent state. Opposite ends 523 of the conductive wire in one coil 521 may be electrically connected to a transmission module (e.g., the transmission module 201, the first transmission module 201a, and/or the second transmission module 201b of FIG. 2).

According to various embodiments of the disclosure, the coils 421 and 521 may be disposed on a ferrite member 429 (e.g., any of both surfaces), and may be sequentially arranged in one direction (e.g., the X-axis direction) within the wireless power transmission device 300. In an embodiment of the disclosure, the ferrite member 429 may focus electromagnetic fields generated by each the coils 421 and 521 to a predetermined space or direction, and block the electromagnetic fields from being induced in another structure or an electronic component of the wireless power transmission device 300. In an embodiment of the disclosure, each coil 421 or 521 may be arranged to partially overlap another adjacent coil. Here, the term "overlap" may mean that two adjacent coils 421 and 521 overlap, for example, when viewed in the Z-axis direction of FIG. 3 or 4.

According to various embodiments of the disclosure, the conductive wire region 529a of a first coil 421a may be disposed to partially overlap the opening region 529b of an adjacent second coil 423a (e.g., a second overlapping region OR2 of FIG. 4), and the conductive wire region 529a of the second coil 423a may be disposed to partially overlap the opening region 529b of an adjacent third coil 425a (e.g., a fourth overlapping region OR4 of FIG. 4) while partially overlapping the opening region 529b of the adjacent first coil 421a (e.g., the first overlapping region OR1 of FIG. 4). In an embodiment of the disclosure, the conductive wire region 529a of the third coil 425a may be disposed to partially overlap the opening region 529a of a fourth coil 421b (e.g., a sixth overlapping region OR6 of FIG. 4), and the conductive wire region 529a of the fourth coil 421b may be disposed to partially overlap the opening region 529a of the third coil 425a (e.g., a fifth overlapping region OR5 of FIG. 4). In some embodiments of the disclosure, the opening region 529b of the fifth coil 423b may be disposed to partially overlap the conductive wire region 529a of the fourth coil 421b (e.g., an eighth overlapping region OR8 of FIG. 4), and may be disposed to partially overlap the conductive wire region 529a of the sixth coil 425b (e.g., a ninth overlapping region OR9 of FIG. 4). In FIG. 4, a third overlapping region OR3 may be provided as the opening region 529b of the second coil 423a and the conductive wire region 529a of the third coil 425a overlap each other, a seventh overlapping region OR7 may be provided as the opening region 529b of the fourth coil 421b and the conductive wire region 529a of the fifth coil 423b overlap each other, and a tenth overlapping region OR10 may be provided as the conductive wire region 529a of the fifth coil 423b and the opening region 529b of the sixth coil 425b overlap each other. In the following detailed description, a region in which an opening region 529b of one coil and a conductive wire region 529a of another coil adjacent thereto overlap, or a region in which a conductive wire region 529a of one coil and an opening region 529b of another coil adjacent thereto may be referred to as an "overlapping region" (e.g., an "overlapping region OR" in FIG. 5), and when distinction is necessary, ordinal numbers such as "first" and "second" may be written together. For example, the overlap region OR provided as the conductive wire region 529a of the first coil 421a and the opening region 529b of the second coil 423a overlap each other may be defined a "first overlapping region" (e.g., the "first region OR1" of FIG. 6), and the overlapping region OR provided as the opening region 529b of the first coil 421a and the conductive wire region 529a of the second coil 423a overlap each other may be defined as a "second overlapping region" (e.g., the "second overlapping region OR2" of FIG. 6).

According to various embodiments of the disclosure, the first coil unit 402a (e.g., the first coil unit 202a of FIG. 2) may include a first coil 421a, a second coil 423a, and/or a third coil 425a, and the second coil unit 402b (e.g., the second coil unit 202b of FIG. 2) may include a fourth coil 421b, a fifth coil 423b, and/or a sixth coil 425b. In another embodiment of the disclosure, the wireless power transmission device 300 (e.g., the wireless power transmission device 200 of FIG. 2) may further include additional coils and/or a transmission module(s) (not illustrated). It is noted that various embodiments of the disclosure are not limited to the illustrated embodiments. The transmission module 201 (e.g., the first transmission module 201a and/or the second transmission module 201b of FIG. 2) may select at least one of the coils 221 and 421 to wirelessly transmit power. For example, the first transmission module 201a may select at least one of the first coil 421a, the second coil 423a, and/or the third coil 425a to perform wireless power transmission, and the second transmission module 201b may select at least one of the fourth coil 421b, the fifth coil 423b, and/or the sixth coil 425b to perform wireless power transmission.

According to various embodiments of the disclosure, when one selected coil performs wireless power transmission, an electromagnetic field that is interfered with or induced in another adjacent coil may reduce transmission efficiency of power. When an electromagnetic field is generated in the other coil due to the interference, heat generation may be caused in a reception-side electronic device (e.g., the external electronic device 291, 293, 391, 393, or 395 of FIG. 2 or 3), as described above. When the coil (e.g., the coils 421 and 521 of FIG. 4 or 5) is applied with voltage and/or current to generate an electromagnetic field, magnetic flux density may be the highest in the opening region of the coil (e.g., the opening region 529b of FIG. 5). For example, the opening region of one coil (e.g., the opening region 529b of the first coil 421a in FIG. 4) is disposed to overlap the conductive wire region of another coil adjacent thereto (e.g., the conductive wire region 529a of the second coil 423a in FIG. 4), the amount of electromagnetic fields that interfere or are induced between the coils may be increased. According to various embodiments of the disclosure disclosed herein, the wireless power transmission device 300 may include at least one shielding member (e.g., the shielding members 611 and 613 of FIG. 6), thereby forming suppressing electromagnetic coupling or interference between the coils 221, 421, and 521. In an embodiment of the disclosure, each shielding member may be disposed on at least a portion of the overlapping region OR. For example, while being disposed in the conductive wire region 529a of one coil, each shielding member may be disposed to at least partially overlap the opening region 529b of another adjacent coil.

The configuration or arrangement of the shielding member will be described with further reference to FIG. 6. Coils 625a and 621b of an embodiment to be described with reference to FIGS. 6 and/or 7 to 10 may be examples of any two coils disposed adjacent to each other among the coils 421 of FIG. 4. In the embodiment illustrated in FIG. 4, ten overlapping regions (e.g., the overlapping regions OR of FIG. 5) may be provided, and a shielding member may be disposed in at least one of the overlapping regions OR.

Figure 6:
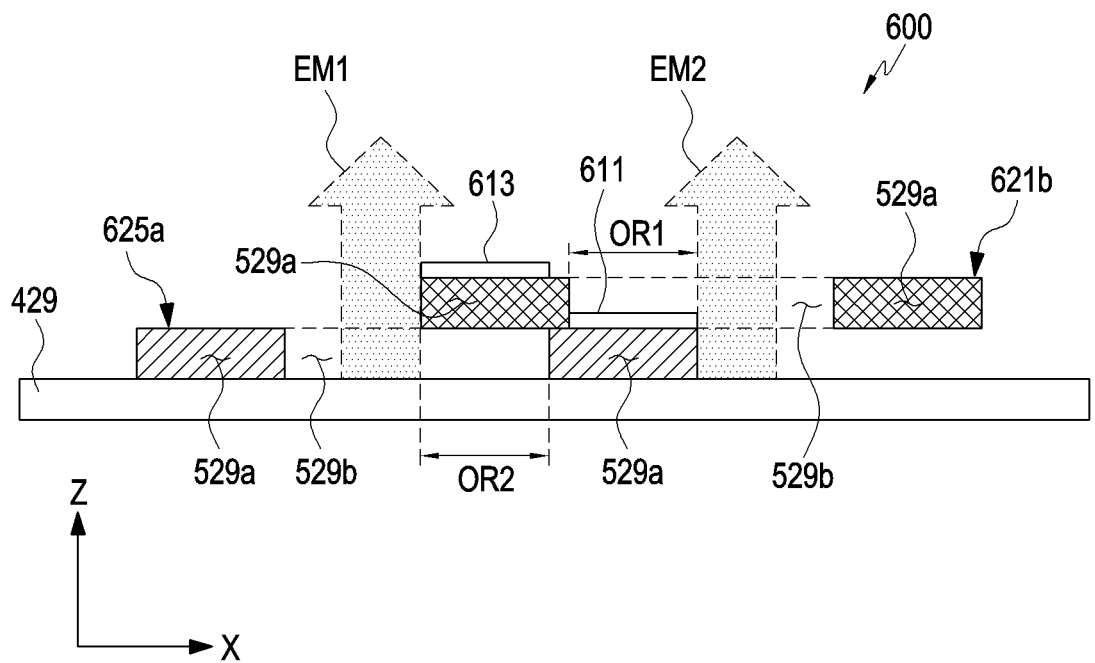
FIG. 6 is a side view for describing a state in which shielding members of a wireless power transmission device according to an embodiment of the disclosure.

FIG. 6 is a side view for describing the state in which shielding members 611 and 613 of a wireless power transmission device 600 (e.g., the wireless power transmission device 200 or 300 of FIG. 2 or 3) according to an embodiment of the disclosure.

Referring to FIG. 6, the wireless power transmission device 600 may include a first coil 625a (e.g., the third coil 425a in FIG. 4) disposed on a ferrite member 429, a second coil 621b (e.g., the fourth coil 421b in FIG. 4), and/or at least one shielding member 611 or 613. In an embodiment of the disclosure, the first coil 625a may be electrically connected to a first transmission module (e.g., the first transmission module 201a of FIG. 2), and the first transmission module 201a may wirelessly transmit power by using the first coil 625a. In another embodiment of the disclosure, the second coil 621b may be electrically connected to a second transmission module (e.g., the second transmission module 201b of FIG. 2), and the second transmission module 201b may wirelessly transmit power by using the second coil 621b. In some embodiments of the disclosure, the first coil 625a and the second coil 625b may be electrically connected to the first transmission module (e.g., the first transmission module 201a of FIG. 2). For example, the first transmission module 201a may wirelessly transmit power by using the first coil 625a or the second coil 625b. According to an embodiment of the disclosure, the first coil 625a and the second coil 621b may each include a conductive wire region 529a and an opening region 529b surrounded by the conductive wire region 529a, and be arranged along the X-axis direction. In another embodiment of the disclosure, in the Z-axis direction, a portion of the conductive wire region 529a of the first coil 625a may be disposed to overlap a portion of the opening region 529b of the second coil 621b, and a portion of the conductive wire region 529a of the second coil 621b may be disposed to overlap a portion of the opening region 529b of the first coil 625a. For example, at least a portion of the top surface of the first coil 625a may be disposed to face at least a portion of the bottom surface of the second coil 621b. In the following description, an overlapping region provided as the conductive wire region 529a of the first coil 625a and the opening region 529b of the second coil 621b overlap each other will be referred to as a "first overlapping region OR1," and an overlapping region provided as the conductive wire region 529a of the second coil 625b and the opening region 529b of the first coil 625a overlap each other will be referred to as a "second overlapping region OR2."

According to various embodiments of the disclosure, the shielding members 611 and 613 may be made of ferrite or nanocrystal having magnetic permeability of 1500 Wb/m² or higher and 40000 Wb/m² or lower, and may be polygonal, elliptical, or circular when viewed in the Z-axis direction. In an embodiment of the disclosure, the shielding members 611 and 613 include a first shielding member 611 disposed on at least a portion of the first overlapping region OR1, and a second shielding member 613 disposed on at least a portion of the second overlapping region OR2. For example, the first shielding member 611 may be attached to or mounted on the first coil 625a (e.g., the conductive wire region 529a), and may at least partially overlap the opening region 529b of the second coil 621b. Similarly, the second shielding member 613 may be attached to or mounted on the second coil 621b (e.g., the conductive wire region 529a), and may at least partially overlap the opening region 529b of the first coil 625a. In some embodiments of the disclosure, the shielding members 611 and 613 may be disposed on at least a portion of the overlapping region OR1 and at least a portion of the overlapping region OR2, respectively, and may have shapes or sizes substantially corresponding to the overlapping regions OR1 and OR2, respectively. In another embodiment of the disclosure, one shielding member 611 or 613 may be disposed on the overlapping regions OR1 and OR2 between two adjacent coils, and in another embodiment of the disclosure, the shielding member(s) may be disposed in an overlapping region provided by any two adjacent coils among the coils 421 illustrated in FIG. 4.

In the illustrated embodiment of the disclosure, the shielding members 611 and 613 are illustrated as separate shapes with respect to each other. However, it is noted that the various embodiments disclosed herein are not limited thereto. For example, the shielding members 611 and 163 may be made as one piece or a single piece, and a portion of one shielding member may be disposed in the conductive wire region 529a of the first coil 625a, and the other portion may be disposed in the conductive wire region 529a of the second coil 621b. In some embodiments of the disclosure, the shielding members 611 and 613 may be provided in the form of a film and may be attached to the coils 625a and 621b. In other embodiments of the disclosure, the shielding members 611 and 613 may be provided on the first overlapping region OR1 (e.g., the first overlapping region OR1 and/or the fifth overlapping region OR5 of FIG. 4) and/or the second overlapping region OR2 (e.g., the second overlapping region OR2 and/or the sixth overlapping region OR6 of FIG. 4) by curing a paint or ink applied to the conductive wire regions 529a of the coils 625a and 621b.

According to various embodiments of the disclosure, the wireless power transmission device 600 (e.g., the wireless power transmission device 200 or 300 of FIG. 2 or 3) may select one of the first coil 625a and the second coil 621b to wirelessly transmit power, or may wirelessly transmit power by using the first coil 625a and the second coil 621b at the same time. In an embodiment of the disclosure, the first shielding member 611 may suppress or at least partially block the electromagnetic field EM2 generated in the second coil 621b due to the application of current from being interfered with or induced in the conductive wire region 529a of the first coil 625a. In another embodiment of the disclosure, the second shielding member 613 may suppress or at least partially block the electromagnetic field EM1 generated in the first coil 625a due to the application of current from being interfered with or induced in the conductive wire region 529a of the second coil 621b. For example, when the wireless power transmission device 600 selects or uses the first coil 625a to wirelessly transmit power, the first shielding member 611 may block power leakage to the second coil 621b, and when the wireless power transmission device 600 selects or uses the second coil 621b to wirelessly transmit power, the second shielding member 613 may block power leakage to the first coil 625a.

According to various embodiments of the disclosure, the wirelessly transmitted energy may be reduced as much as power is leaked to the other unselected coil, and when the unselected coil generates an electromagnetic field by using the leaked power, the reception-side electronic device (e.g., the external electronic device 391, 393, or 395 of FIG. 3) may generate heat, as described above. The shielding member(s) 611 and 613 in the wireless power transmission device 200, 300, or 600 according to various embodiments disclosed herein may block power leakage to the unselected coil when the selected coil wirelessly transmits power, thereby preventing a decrease in power transmission efficiency and preventing or suppressing heat generation in the reception-side electronic device.

According to various embodiments of the disclosure, the first shielding member 611 may be disposed on the top surface of the first coil 625a (e.g., the surface facing the +Z-axis direction). For example, the first shielding member 611 may be located to face the bottom surface of the second coil 621b (e.g., the surface facing the −Z-axis direction). In some embodiments of the disclosure, the first shielding member 611 may be substantially accommodated in the opening region 529b of the second coil 621b. In another embodiment of the disclosure, the second shielding member 613 may be disposed on the top surface of the second coil 621b.

According to various embodiments of the disclosure, as illustrated in FIG. 4, in the structure in which a plurality of coils 421 are arranged to provide a plurality of overlapping regions OR, when the shielding members 611 and 613 are disposed on selected one or two overlapping regions OR, the shielding members may be disposed on the overlapping regions OR1 and OR2 provided by the third coil 425a (e.g., the first coil 625a in FIG. 6) belonging to the first coil unit 402a and the fourth coil 421b (e.g., the second coil 621b in FIG. 6) belonging to the second coil unit 402b. For example, the shielding members 611 and 613 may block interference or induction of an electromagnetic field between two adjacent coils, or may block interference or induction of an electromagnetic field between two adjacent coil units.

In addition, the shielding members may be variously arranged, which will be described with reference to FIGS. 7 to 10.

FIGS. 7, 8, 9, and 10 are side views illustrating various embodiments regarding an arrangements of shielding members in a wireless power transmission device according to various embodiments of the disclosure.

Figure 7:
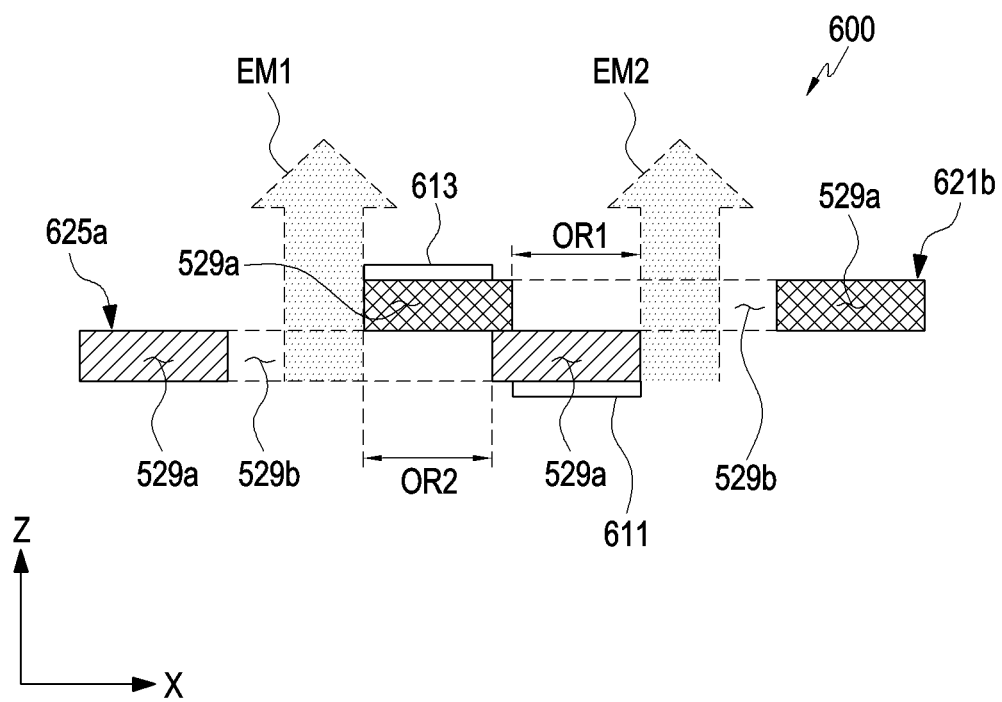
FIGS. 7, 8, 9, and 10 are side views illustrating various embodiments regarding an arrangement of shielding members in a wireless power transmission device according to various embodiments of the disclosure.

Referring to FIG. 7, the first shielding member 611 may be disposed on the bottom surface of the first coil 625a, and the second shielding member 613 may be disposed on the top surface of the second coil 621b. In some embodiments of the disclosure, when the first coil 625a is placed to be in contact with the ferrite member 429 of FIG. 6, the first shielding member 611 may be disposed on the top surface of the first coil 625a as in FIG. 6, rather than on the bottom surface of the first coil 625a.

Figure 8:
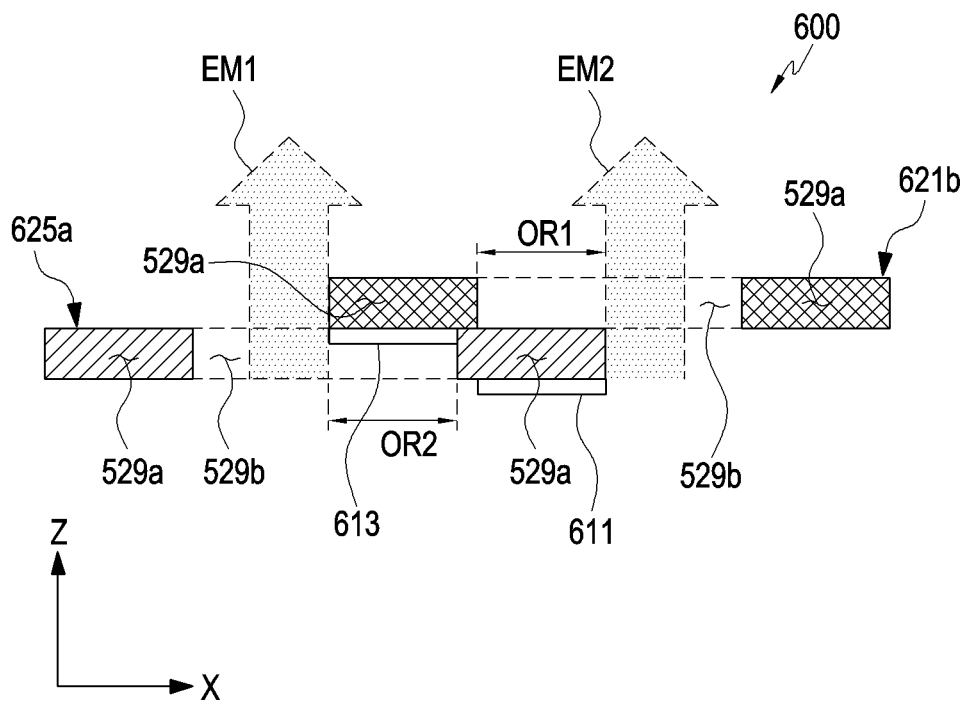

Referring to FIG. 8, the first shielding member 611 may be disposed on the bottom surface of the first coil 625a, and the second shielding member 613 may be disposed on the bottom surface of the second coil 621b. In some embodiments of the disclosure, when the first coil 625a is placed to be in contact with the ferrite member 429 of FIG. 6, the first shielding member 611 may be disposed on the top surface of the first coil 625a as in FIG. 6, rather than on the bottom surface of the first coil 625a. The second shielding member 613 may be positioned to face the top surface of the first coil 625a. In an embodiment of the disclosure, the second shielding member 613 may be substantially accommodated in the opening region 529b of the first coil 625a.

Figure 9:
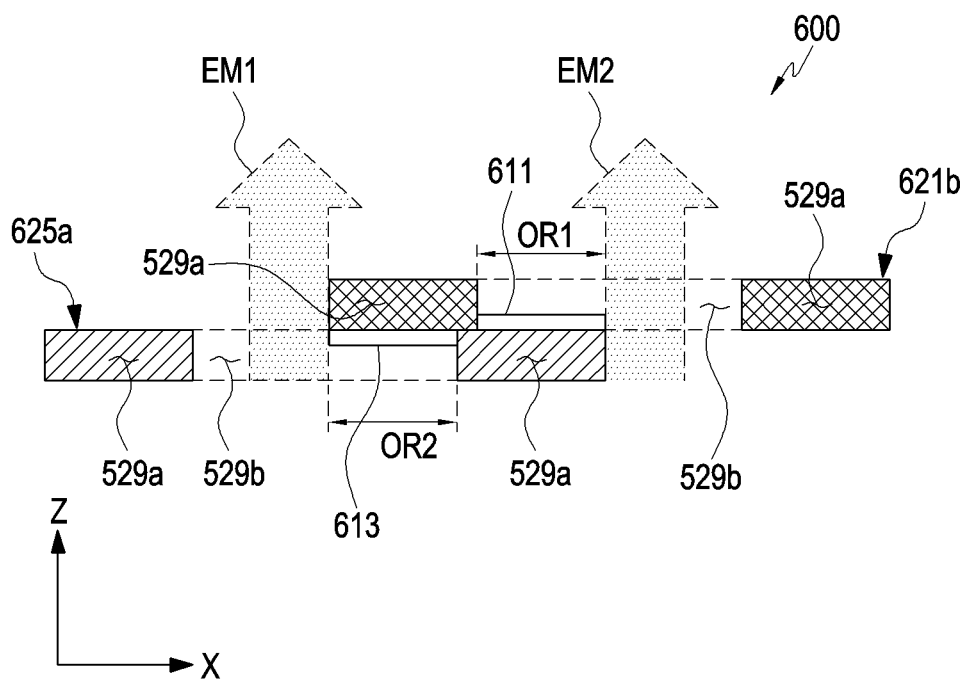

Referring to FIG. 9, the first shielding member 611 may be disposed on the top surface of the first coil 625a, and the second shielding member 613b may be disposed on the bottom surface of the second coil 621b. For example, the first shielding member 611 may be disposed to face the bottom surface of the second coil 621b, and the second shielding member 613 may be disposed to face the top surface of the first coil 625a. In some embodiments of the disclosure, the first shielding member 611 may be substantially accommodated in the opening region 529b of the second coil 625b, and the second shielding member 613 may be substantially accommodated in the opening region 529b of the first coil 625a. Assuming that the thicknesses of the ferrite member 429, the coils 625a and 621b, and the shielding members 611 and 613 are the same, the arrangement structure of FIG. 9 may be easier to miniaturize compared to the arrangement structures of FIGS. 6 to 8. For example, since the shielding members 611 and 613 are accommodated in the opening region 529b, the thicknesses of the shielding members 611 and 613 may not substantially affect the thickness of the wireless power transmission device 600.

Figure 10:
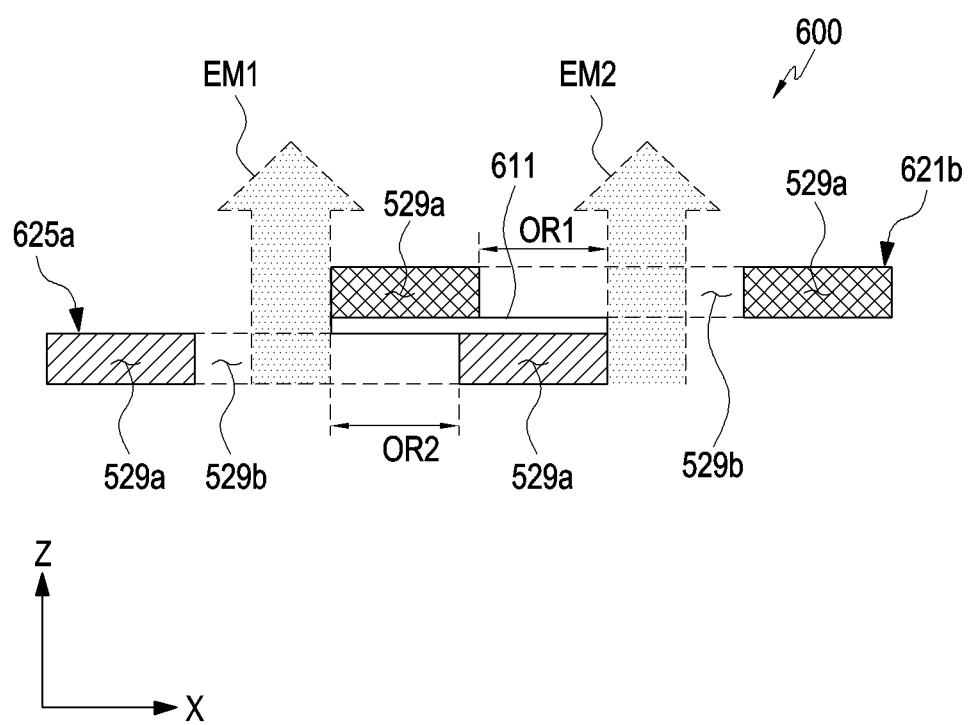

Referring to FIG. 10, the wireless power transmission device 600 according to various embodiments of the disclosure disclosed herein may include a single shielding member 615 disposed between two adjacent coils 625a and 621b. The shielding member 615 may be disposed between the top surface of the first coil 625a and the bottom surface of the second coil 621b, and may extend from the first overlapping region OR1 to the second overlapping region OR2. For example, the shielding member 615 may block the electromagnetic field generated by the second coil 621b from being interfered with or induced in the first coil 625a in the first overlapping region OR1, and may block the electromagnetic field generated by the first coil 625a from being interfered with or induced in the second coil 621b in the second overlapping region OR2.

Figure 11:
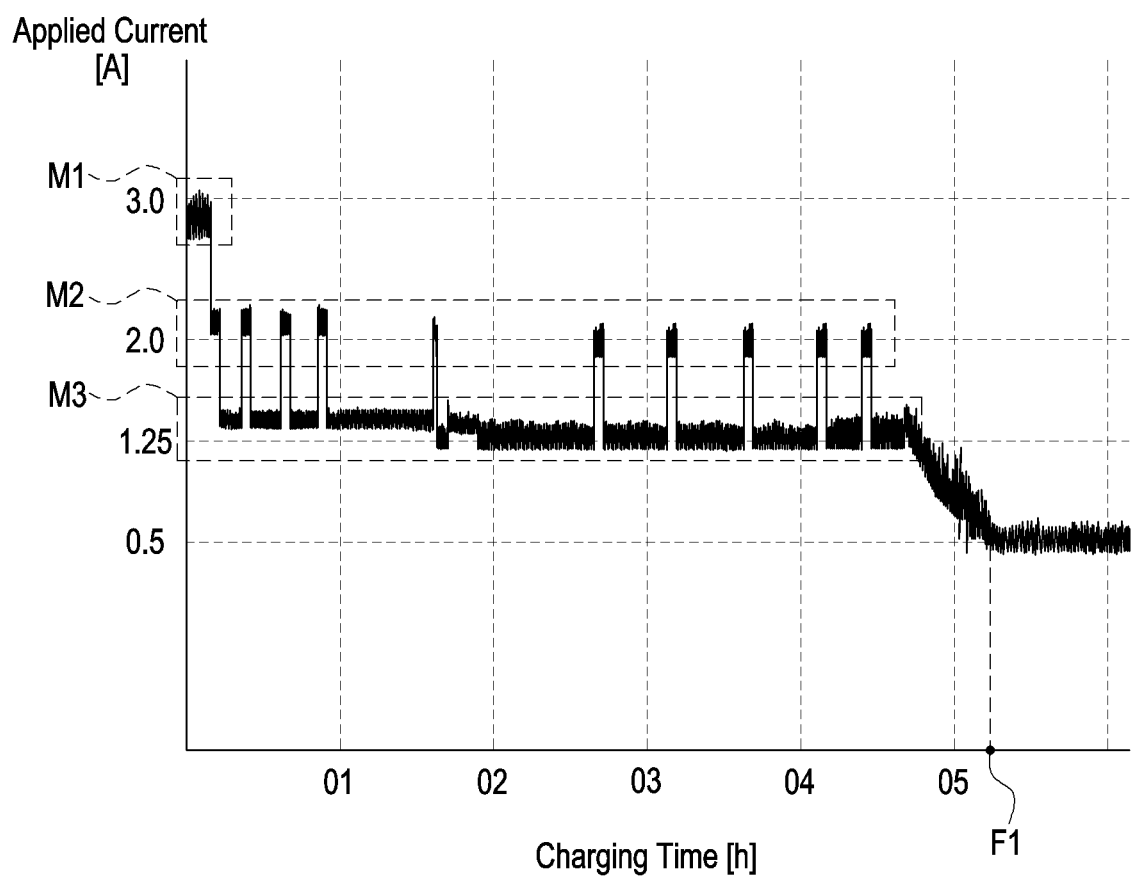
FIG. 11 is a graph illustrating charging current measured while charging is performed in a wireless power transmission device in which no shielding members are disposed according to an embodiment of the disclosure.

FIG. 11 is a graph illustrating charging current measured while performing charging in a wireless power transmission device in which shielding members are not disposed according to an embodiment of the disclosure.

Figure 12:
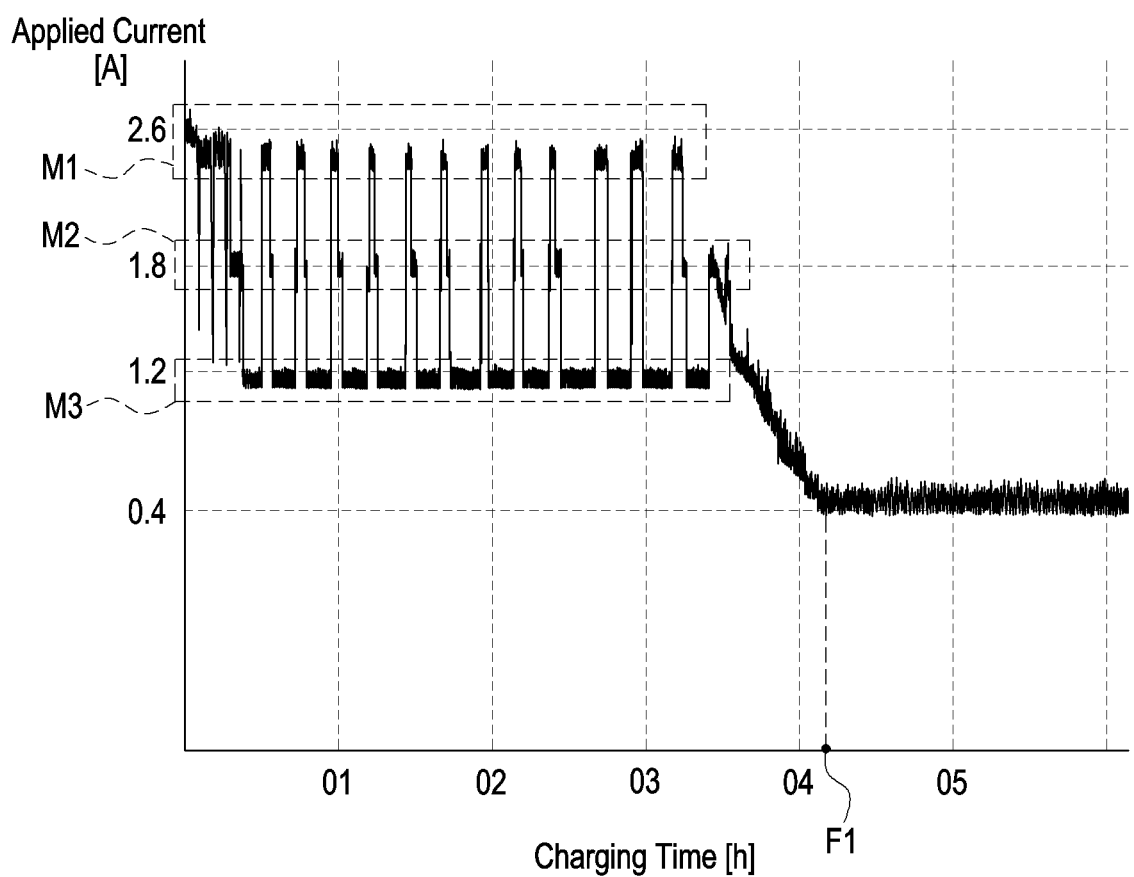
FIG. 12 is a graph illustrating charging current measured while charging is performed in a wireless power transmission device according to an embodiment of the disclosure.

FIG. 12 is a graph illustrating charging current measured while performing charging in a wireless power transmission device according to an embodiment of the disclosure.

The graphs of FIGS. 11 and 12 are graphs obtained by measuring charging current consumed by a wireless power transmission device 200, 300, or 600 by receiving input voltage about 9 V and a time required to complete charging when two external electronic devices (e.g., two external electronic devices among the external electronic devices 291, 293, 391, 393, and 395 of FIG. 2 or 3) in which a first mode M1 may indicate that the wireless power transmission device 200, 300, or 600 provides high-speed charging to two external electronic devices at the same time, a second mode M2 may indicate that while high-speed charging is provided to one of the two external electronic devices, normal or low-speed charging is provided to the other electronic device, and a third mode M3 may indicate that normal or low-speed charging is provided to two external electronic devices.

According to various embodiments of the disclosure, depending on the temperature of the external electronic device 291, 293, 391, 393, or 395, the external electronic device 291, 293, 391, 393, or 395 may request adjustment of the speed of wireless charging or adjustment of the intensity of transmitted power, and the wireless power transmission device 200, 300, or 600 may adjust the speed based on the request from the external electronic device 291, 293, 391, 393, or 395. For example, when heat is generated during high-speed charging and the temperature of the external electronic device 291, 293, 391, 393, or 395 reaches about 40 degrees C., the external electronic device 291, 293, 391, 393, or 395 may request reduction of the speed of wireless charging, and the wireless power transmission device 291, 293, 391, 393, or 395 may lower the transmission power according to the request from the external electronic device 291, 293, 391, 393, or 395. When the temperature of the external electronic device 291, 293, 391, 393, or 395 is lowered again to approximately 35 degrees C., the external electronic device 291, 293, 391, 393, or 395 may request increase of the speed of wireless charging, and the wireless power transmission device 200, 300, or 600 may provide high-speed charging by increasing transmission power according to the request from the external electronic device 291, 293, 391, 393, or 395.

According to various embodiments of the disclosure, when a transmission-side coil (e.g., a coil selected from among the coils 421, 625a, and 621b of FIG. 4 or 6) and a reception-side coil (e.g., a coil embedded in an external electronic device 291, 293, 391, 393, or 395 of FIG. 2 or 3 are not properly aligned, heat may be generated in the external electronic device 291, 293, 391, 393, or 395 during the wireless charging. In another embodiment of the disclosure, when a wireless power transmission device 200, 300, or 600 includes a plurality of coils 421, 625a, and 621b, and an electromagnetic field is generated from an unselected coil, a reception-side electronic device (e.g., the external electronic device 291, 293, 391, 393, or 395 of FIG. 2 or 3) may generate heat. For example, when heat is generated from a reception-side electronic device, it may mean that the wireless power transmission efficiency is low.

Referring to FIGS. 11 and 12, it can be seen that, when charging two external electronic devices among the electronic devices 291, 293, 391, 393, and 395 at the same time, the wireless power transmission device 200, 300, or 600 according to various embodiments disclosed herein may reduce the time required for completing charging F1 and F2 by approximately 1 hour while consuming lower charging current in respective modes M1, M2, and M3 compared to the wireless power transmission device that does not include shielding members (e.g., the shielding members 611, 613, and 615 of FIGS. 6 to 10). For example, it can be seen that the wireless power transmission device that includes a plurality of coils 421, 625a, and 621b and does not include the shielding members 611, 613, and 615 mainly utilizes the third mode M3 to provide wireless charging, whereas the wireless power transmission device 200, 300, or 600 according to various embodiments disclosed herein may provide wireless charging by evenly utilizing the first mode M1, the second mode M2, and/or the third mode M3. When wireless charging is performed via the wireless power transmission device 200, 300, or 600 according to various embodiments disclosed herein, power transmission efficiency may be improved, heat generation from an external electronic device may be suppressed, and a high-speed charging time may be secured to reduce the time required for wireless charging.

Figure 13:
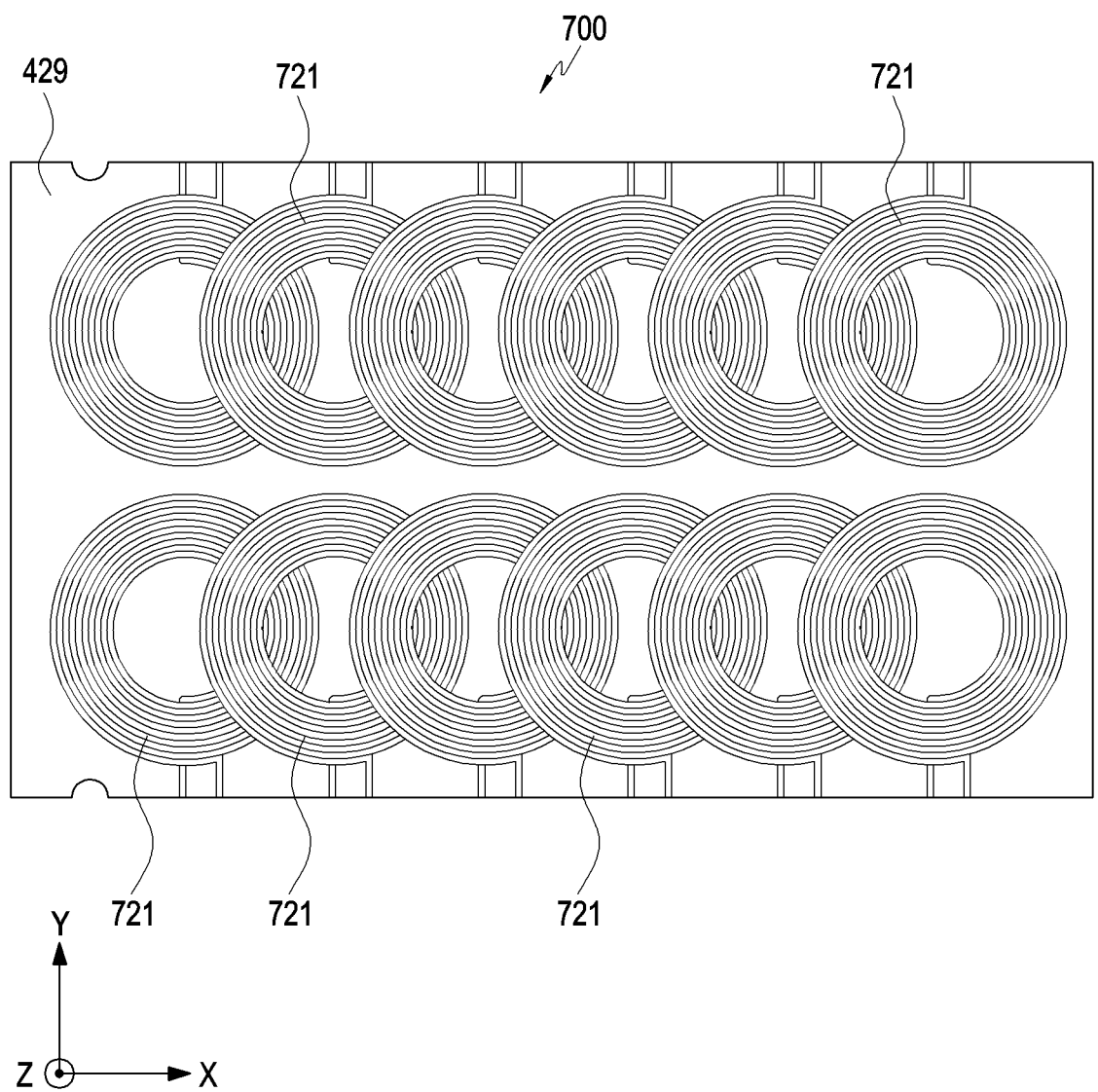
FIGS. 13, 14, and 15 are views illustrating modifications concerning the arrangements or shapes of coils in a wireless power transmission device according to various embodiments of the disclosure.
Figure 14:
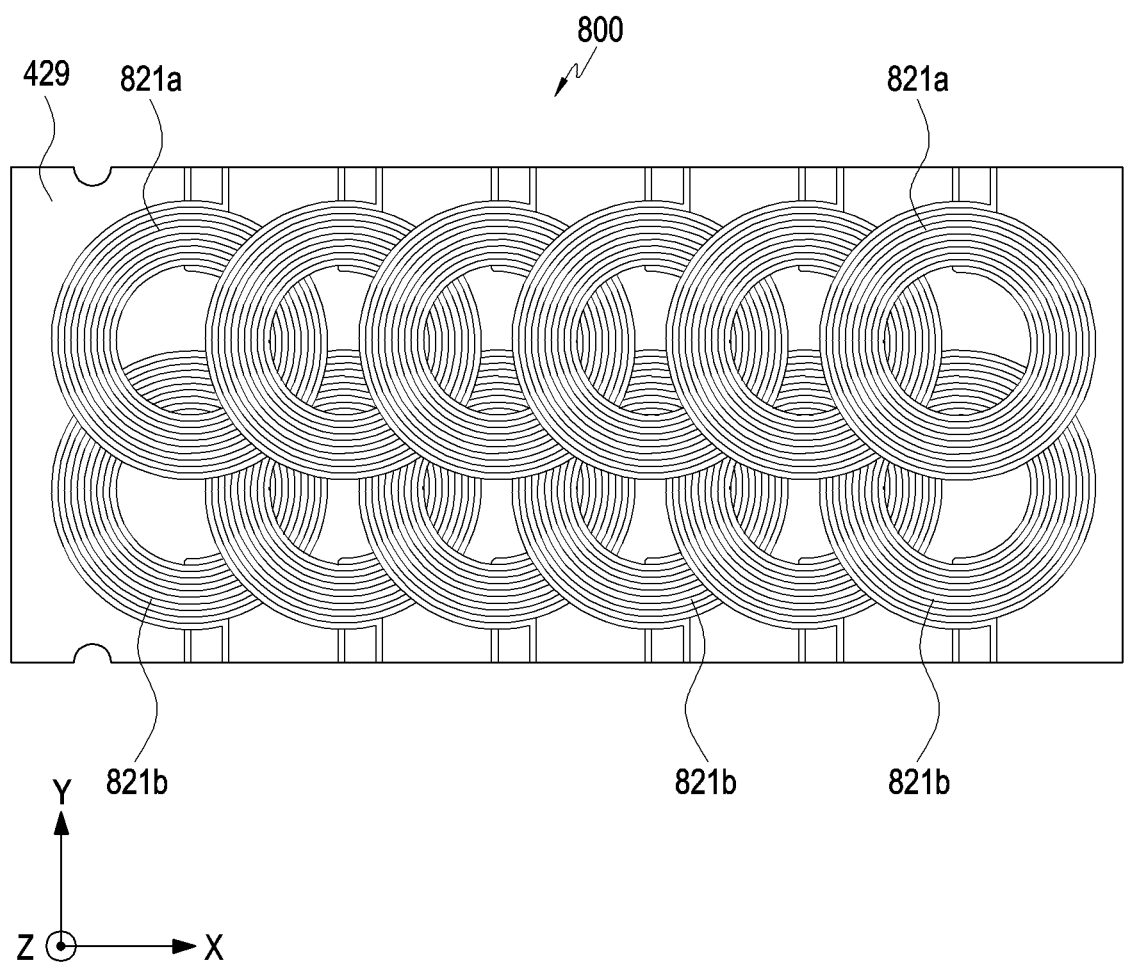
Figure 15:
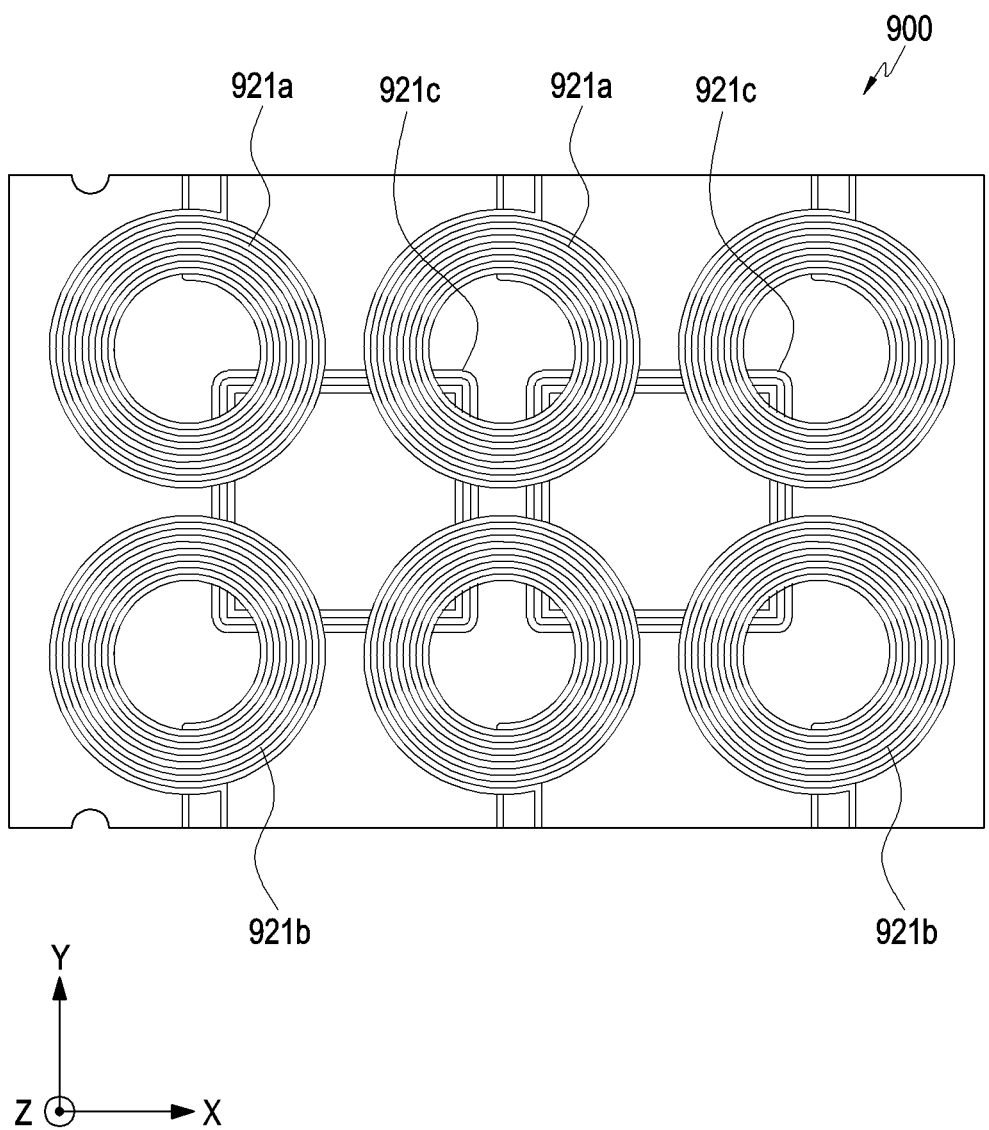

FIGS. 13 to 15 are view illustrating modified examples of arrangements or shapes of coils in wireless power transmission devices according to various embodiments of the disclosure.

Referring to FIG. 13, a wireless power transmission device 700 (e.g., the wireless power transmission device 200 or 300 of FIG. 2 or 3) may include a plurality of coils 721 provided in an N*M arrangement. In the illustrated embodiment of the disclosure, a configuration in which the coils are provided a 2*6 arrangement is exemplified, but various embodiments disclosed herein are not limited thereto, and the number of rows or columns may vary. According to an embodiment of the disclosure, the coils 721 in the first row may form overlapping regions (e.g., the overlapping regions OR1 to OR10, or in FIG. 4 or 5) with other adjacent coils, and the coils 721 in the second row may form overlapping regions (e.g., the overlapping regions OR1 to OR10, or OR in FIG. 4 or 5) with other adjacent coils. In another embodiment of the disclosure, the coils 721 in the first row may not form overlapping regions with the coils in the second row. As described in the above-described embodiments of the disclosure, a shielding member (e.g., the shielding member 611 or 613 of FIG. 6) may be disposed in at least one of the overlapping regions.

According to various embodiments of the disclosure, the first transmission module (e.g., the first transmission module 201a of FIG. 2) may be electrically connected to the coils 721 of the first row among the coils 721, and the second transmission module (e.g., the second transmission module 201b of FIG. 2) may be electrically connected to the coils 721 in the second row. In another embodiment of the disclosure, the first transmission module 201a may be electrically connected to the coils 721 in the first column, the second column, and the third column among the coils 721, and the second transmission module 201b may be electrically connected to the coils 721 in the fourth column, the fifth column, and the sixth column. In another embodiment of the disclosure, the coils 721 in the first and second columns may be electrically connected to the first transmission module 201a, the coils 721 in the third and fourth columns may be electrically connected to the second transmission module 201b, and the coils 721 in the fifth and sixth columns may be electrically connected to a third transmission module (not illustrated).

Referring to FIG. 14, a wireless power transmission device 800 (e.g., the wireless power transmission device 200 or 300 of FIG. 2 or 3) may include a plurality of coils 821a and 821b provided in an N*M arrangement (e.g., a 2*6 arrangement). According to an embodiment of the disclosure, the first coils 821a in the first row may form overlapping regions (e.g., the overlapping regions OR1 to OR10, or OR in FIG. 4 or 5) with other adjacent first coils 821a, and the coils 821b in the second row may form overlapping regions (e.g., the overlapping regions OR1 to OR10, or OR in FIG. 4 or 5) with other adjacent second coils 821b. In another embodiment of the disclosure, the first coils 821a may form an additional overlapping region with one of the second coils 821b. As described in the above-described embodiments of the disclosure, a shielding member (e.g., the shielding member 611 or 613 in FIG. 6) may be disposed in at least one of the overlapping regions. The wireless power transmission device 800 may include at least one transmission module (e.g., the transmission module 201, the first transmission module 201a, and/or the second transmission module 201b of FIG. 2), and may wireless provide power to an external electronic device (e.g., the external electronic device 391, 393, or 395 of FIG. 3) by using at least one of the coils 821a and 821b.

Referring to FIG. 15, a wireless power transmission device 900 (e.g., the wireless power transmission devices 200 and 300 of FIG. 2 or 3) may include a plurality of first coils 921a, a plurality of second coils 921b, and/or a plurality of third coils 921c provided in an N*M arrangement (e.g., a 2*3 arrangement). First coils 921a may not form an overlapping region with another adjacent first coil 921a or second coil 921b, and second coils 921b may not form an overlapping region with another adjacent second coil 921b or the first coils 921a. In the illustrated embodiment of the disclosure, the third coils 921c are overlapped with at least one coil selected from among the first coils 921a and/or at least one coil selected from among the second coils 921b (e.g., FIG. 4 or 5) of overlapping regions OR1 to OR10, OR) may be formed, and a shielding member (e.g., the shielding members 611 and 613 of FIG. 6) may be disposed in the overlapping region. According to an embodiment of the disclosure, third coil(s) 921c may have a substantially polygonal shape when viewed in a plan view. For example, according to various embodiments disclosed herein, the shapes of the coils may be variously selected depending on the shape or arrangement structure of an inner space of a wireless power transmission device (e.g., the wireless power transmission device 300 of FIGS. 2 and/or 3).

As described above, according to various embodiments of the disclosure disclosed herein, a wireless power transmission device (e.g., the wireless power transmission device 200, 300, or 600 in FIGS. 2, 3 and/or 6) may include a first coil (e.g., the third coil 425a in FIG. 4 or the first coil 625a in FIG. 6) including a first conductive wire region (e.g., the conductive wire region 529a in FIG. 5) configured with an arrangement of a conductive wire and a first opening region (e.g., the opening region 529b in FIG. 5) surrounded by the first conductive wire region, a second coil (e.g., the fourth coil 421b in FIG. 4 or the second coil 621b in FIG. 6) including a second conductive wire region (e.g., the conductive wire region 529a in FIG. 5) configured with an arrangement of a conductive wire, and a second opening region (e.g., the opening region 529b in FIG. 5) surrounded by the second conductive wire region, a first overlapping region (e.g., the overlapping region OR in FIG. 5 or the first overlapping region OR1 in FIG. 6) provided as a portion of the first conductive wire region overlaps a portion of the second opening region, and a first shielding member (e.g., the first shielding member 611 in FIG. 6) disposed on at least a portion of the first overlapping region. The first shielding member may be configured to at least partially block interference of an electromagnetic field generated by the second coil (e.g., the electric field "EM2" in FIG. 6) in the first conductive wire region.

According to various embodiments of the disclosure, the first coil and the second coil may have a flat plate shape.

According to various embodiments of the disclosure, the top surface of the first coil may be disposed to face the bottom surface of the second coil, and the first shielding member may be disposed on at least one of the top surface and the bottom surface of the first coil.

According to various embodiments of the disclosure, the wireless power transmission device described above may further include a second overlapping region (e.g., the overlapping region OR in FIG. 5 or the second overlapping region OR2 in FIG. 6) provided as a portion of the second conductive wire region overlaps a portion of the first opening region, and a second shielding member (e.g., the second shielding member 613 in FIG. 6) disposed on at least a portion of the second overlapping region. The first coil may be configured to generate an electromagnetic field (e.g., the electromagnetic field "EM1" in FIG. 6) by receiving current, and the second shielding member may be configured to at least partially block the electromagnetic field generated by the first coil from being interfered with the second conductive wire area.

According to various embodiments of the disclosure, the bottom surface of the second coil may be disposed to face the top surface of the first coil, and the second shielding member may be disposed on at least one of the top surface and the bottom surface of the second coil.

According to various embodiments of the disclosure, the top surface of the first coil may be disposed to face the bottom surface of the second coil, and the first shielding member and the second shielding member may be disposed between the top surface of the first coil and the bottom surface of the second coil.

According to various embodiments of the disclosure, the first shielding member may include ferrite or nanocrystal having magnetic permeability of 1500 Wb/m$^2$ or higher and 40000 Wb/m$^2$ or lower.

According to various embodiments of the disclosure, the wireless power transmission device described above may further include a first transmission module (e.g., the transmission module 201 and/or the first transmission module 201a in FIG. 2) electrically connected to the first coil and configured to wirelessly transmit power by using the first coil, and a second transmission module (e.g., the transmission module 201 and/or the second transmission module 201b in FIG. 2) electrically connected to the second coil and configured to wirelessly transmit power by using the second coil.

According to various embodiments of the disclosure, the wireless power transmission device described above may further include a third coil (e.g., the second coil 423a in FIG. 4) including a third conductive wire region (e.g., the conductive wire region 529a in FIG. 5) configured with an arrangement of a conductive wire, and a third opening region (e.g., the opening region 529b in FIG. 5) surrounded by the third conductive wire region, a fourth coil (e.g., the fifth coil 423b in FIG. 4) including a fourth conductive wire region (e.g., the conductive wire region 529a in FIG. 5) configured with an arrangement of a conductive wire, and a fourth opening region (e.g., the opening region 529b in FIG. 5) surrounded by the fourth conductive wire region, a first transmission module (e.g., the transmission module 201 and/or the first transmission module 201a in FIG. 2) electrically connected to the first coil and the third coil, and configured to wirelessly transmit power by using a selected one of the first coil and the third coil, and a second transmission module (e.g., the transmission module 201 and/or the second transmission module 201a in FIG. 2) electrically connected to the second coil and the fourth coil, and configured to wirelessly transmit power by using a selected one of the second coil and the fourth coil.

According to various embodiments of the disclosure, the wireless power transmission device described above may further include a third overlapping region provided as a portion of the third conductive wire region overlaps another portion of the first opening region, a fourth overlapping region provided as a portion of the fourth conductive wire region overlaps another portion of the second opening region, and a third shielding member disposed in at least one of the third overlapping region and the fourth overlapping region.

According to various embodiments of the disclosure, the wireless power transmission device described above may further include a ferrite member, and the first coil and the second coil may be disposed on one surface of the ferrite member.

According to various embodiments of the disclosure disclosed herein, a wireless power transmission device (e.g., the wireless power transmission device 200, 300, or 600 of FIGS. 2, 3 and/or 6) may include a plurality of coils (e.g., the coils 421 or 521 in FIG. 4 or 5) including a conductive wire region (e.g., the conductive wire region 529a in FIG. 5) configured with an arrangement of a conductive wire and an opening region (e.g., the opening region 529b in FIG. 5) surrounded by the conductive wire region, at least one shielding member (e.g., the shielding members 611, 613, and 615 of FIGS. 6 to 10) disposed in at least a portion of the conductive wire region, and at least one transmission module (e.g., the transmission module 201, the first transmission module 201a, and/or the second transmission module 201b in FIG. 2) configured to wirelessly transmit power by using at least one of the coils. The coils may be sequentially disposed along one direction (e.g., the X-axis direction in FIG. 4), and the shielding member may be disposed to at least partially overlap the opening region of another adjacent coil.

According to various embodiments of the disclosure, the transmission module may include a first transmission module (e.g., the first transmission module 201a in FIG. 2) and a second transmission module (e.g., the second transmission module 201b in FIG. 2), the first transmission module may be configured to wirelessly transmit power by using a selected one of a first coil, a second coil, and a third coil (e.g., the first to third coils 421a, 423a, and 425a in FIG. 4) from among the coils, and the second transmission module may be configured to wirelessly transmit power by using a selected one of a fourth coil, a fifth coil, and a sixth coil (e.g., the fourth to sixth coils 421b, 423b, and 425b in FIG. 4) from among the coils.

According to various embodiments of the disclosure, the shielding member may include a first shielding member (e.g., the first shielding member 611 in FIG. 6) disposed in the conductive wire region of the third coil (e.g., the first coil 625a in FIG. 6) and disposed to at least partially overlap the opening region of the fourth coil (e.g., the second coil 621b in FIG. 6), and a second shielding member (e.g., the second shielding member 613) disposed in the conductive wire region of the fourth coil and disposed to at least partially overlap the opening region of the third coil.

According to various embodiments of the disclosure, the first shielding member may include ferrite or nanocrystal having magnetic permeability of 1500 Wb/m$^2$ or higher and 40000 Wb/m$^2$ or lower.

According to various embodiments of the disclosure, the shielding member may be disposed on the top surface or the bottom surface of at least one of the coils.

According to various embodiments of the disclosure disclosed herein, a wireless power transmission device (e.g., the wireless power transmission device 200, 300, or 600 in FIGS. 2, 3 and/or 6) may include a first coil (e.g., the third coil 425a in FIG. 4 or the first coil 625a in FIG. 6) including a first conductive wire region (e.g., the conductive wire region 529a in FIG. 5) configured with an arrangement of a conductive wire and a first opening region (e.g., the opening region 529b in FIG. 5) surrounded by the first conductive wire region, a second coil (e.g., the fourth coil 421*b* in FIG. 4 or the second coil 621*b* in FIG. 6) including a second conductive wire region (e.g., the conductive wire region 529*a* in FIG. 5) configured with an arrangement of a conductive wire, and a second opening region (e.g., the opening region 529*b* in FIG. 5) surrounded by the second conductive wire region, at least one transmission module (e.g., the transmission module 201, the first transmission module 201*a*, and/or the second transmission module 201*b* of FIG. 2) configured to wirelessly transmit power by using at least one of the first coil and the second coil, a first overlapping region (e.g., the overlapping region OR in FIG. 5 and/or the first overlapping region OR1 in FIG. 6) provided as a portion of the first conductive wire region overlaps a portion of the second opening region, a second overlapping region (e.g., the overlapping region OR in FIG. 5 and/or the second overlapping region OR2 in FIG. 6) provided as a portion of the second conductive wire region overlaps a portion of the first opening region, and a shielding member (e.g., the shielding members 611, 613, 615 of FIGS. 6 to 10) disposed in at least one of the first overlapping region and the second overlapping region. The shielding member may be configured to at least partially block an electromagnetic field generated in any one of the first coil and the second coil (e.g., the electromagnetic field "EM1" or "EM2" in FIG. 6) from being interfered with the other one of the first coil and the second coil.

According to various embodiments of the disclosure, the transmission module may include a first transmission module (e.g., the first transmission module 201*a* in FIG. 2) and a second transmission module (e.g., the second transmission module 201*b* in FIG. 2), the first transmission module may be configured to wirelessly transmit power by using the first coil, and the second transmission module may be configured to wirelessly transmit power by using the second coil.

According to various embodiments of the disclosure, the shielding member may include a first shielding member (e.g., the first shielding member 611 in FIG. 6) disposed in the first overlapping region and a second shielding member disposed in at least a portion of the second overlapping region (e.g., the second shielding member 613 in FIG. 6).

According to various embodiments of the disclosure, the top surface of the first coil may be disposed to face the bottom surface of the second coil, and the shielding members may be disposed on the first overlapping region and the second overlapping region, respectively, between the top surface of the first coil and the bottom surface of the second coil.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmission device comprising:
    a first coil comprising a first conductive wire region configured with an arrangement of a conductive wire and a first opening region surrounded by the first conductive wire region;
    a second coil comprising a second conductive wire region configured with an arrangement of a conductive wire and a second opening region surrounded by the second conductive wire region;
    a first overlapping region provided as a portion of the first conductive wire region overlaps a portion of the second opening region; and
    a first shielding member disposed in at least a portion of the first overlapping region except for a remaining portion of the second opening region, the remaining portion of the second opening region excluding at least the portion of the first overlapping region,
    wherein the first shielding member is configured to at least partially block an electromagnetic field generated by the second coil from being interfered with the first conductive wire region.
2. The wireless power transmission device of claim 1, wherein the first coil and the second coil have a flat plate shape.
3. The wireless power transmission device of claim 1,
    wherein a top surface of the first coil is disposed to face a bottom surface of the second coil, and
    wherein the first shielding member is disposed on at least one of the top surface and the bottom surface of the first coil.
4. The wireless power transmission device of claim 1, further comprising:
    a second overlapping region provided as a portion of the second conductive wire region overlaps a portion of the first opening region; and
    a second shielding member disposed on at least a portion of the second overlapping region,
    wherein the first coil is configured to generate an electromagnetic field by receiving current, and
    wherein the second shielding member is configured to at least partially block the electromagnetic field generated by the first coil from being interfered with the second conductive wire region.
5. The wireless power transmission device of claim 4,
    wherein a bottom surface of the second coil is disposed to face a top surface of the first coil, and
    wherein the second shielding member is disposed on at least one of the top surface and the bottom surface of the second coil.
6. The wireless power transmission device of claim 4,
    wherein a top surface of the first coil is disposed to face a bottom surface of the second coil, and
    wherein the first shielding member and the second shielding member are disposed between the top surface of the first coil and the bottom surface of the second coil.
7. The wireless power transmission device of claim 1, wherein the first shielding member comprises ferrite or nanocrystal having magnetic permeability of 1500 Wb/m$^2$ or higher and 40000 Wb/m$^2$ or lower.
8. The wireless power transmission device of claim 1, further comprising:
    a first transmission module electrically connected to the first coil and configured to wirelessly transmit power by using the first coil; and
    a second transmission module electrically connected to the second coil and configured to wirelessly transmit power by using the second coil.
9. The wireless power transmission device of claim 1, further comprising:
    a third coil comprising a third conductive wire region configured with an arrangement of a conductive wire and a third opening region surrounded by the third conductive wire region;
    a fourth coil comprising a fourth conductive wire region configured with an arrangement of a conductive wire and a fourth opening region surrounded by the fourth conductive wire region;

a first transmission module electrically connected to the first coil and the third coil and configured to wirelessly transmit power by using a selected one of the first coil and the third coil; and a second transmission module electrically connected to the second coil and the fourth coil, and configured to wirelessly transmit power by using a selected one of the second coil and the fourth coil.

10. The wireless power transmission device of claim 9, further comprising:

a third overlapping region provided as a portion of the third conductive wire region overlaps another portion of the first opening region;

a fourth overlapping region provided as a portion of the fourth conductive wire region overlaps another portion of the second opening region; and a third shielding member disposed in at least one of the third overlapping region and the fourth overlapping region.

11. The wireless power transmission device of claim 1, further comprising:

a ferrite member, wherein the first coil and the second coil are disposed on one surface of the ferrite member.

12. The wireless power transmission device of claim 1, further comprising:

at least one transmission module configured to wirelessly transmit power by using at least one of the first coil and the second coil;

a second overlapping region provided as a portion of the second conductive wire region overlaps a portion of the first opening region; and a second shielding member disposed in the second overlapping region, wherein the second shielding member is configured to at least partially block the electromagnetic field generated by the first coil from being interfered with the second coil.

13. The wireless power transmission device of claim 12, wherein the transmission module comprises a first transmission module and a second transmission module, wherein the first transmission module is configured to wirelessly transmit power by using the first coil, and wherein the second transmission module is configured to wirelessly transmit power by using the second coil.

14. The wireless power transmission device of claim 12, wherein a top surface of the first coil is disposed to face a bottom surface of the second coil, and wherein the first shielding member and the second shielding member are disposed in the first overlapping region and the second overlapping region, respectively, between the top surface of the first coil and the bottom surface of the second coil.

15. The wireless power transmission device of claim 12, wherein the second shielding member comprises ferrite or nanocrystal having magnetic permeability of 1500 Wb/m$^2$ or higher and 40000 Wb/m$^2$ or lower.

16. A wireless power transmission device comprising:

a plurality of coils including a conductive wire region configured with an arrangement of a conductive wire and an opening region surrounded by the conductive wire region;

at least a first shielding member disposed on a top surface of at least one of the coils of the plurality of coils in at least a portion of the conductive wire region;

at least a second shielding member disposed on a bottom surface of a coil adjacent to the at least one of the coils in at least the portion of the conductive wire region, the bottom surface facing in a direction opposite to the top surface; and at least one transmission module configured to wirelessly transmit power by using at least one of the coils, wherein the plurality of coils are sequentially disposed along one direction, and the at least one shielding member is disposed to at least partially overlap the opening region of another adjacent coil.

17. The wireless power transmission device of claim 16, wherein the transmission module includes a first transmission module and a second transmission module, wherein the first transmission module is configured to wirelessly transmit power by using a selected one of a first coil, a second coil, and a third coil from among the coils, and wherein the second transmission module is configured to wirelessly transmit power by using a selected one of a fourth coil, a fifth coil, and a sixth coil from among the coils.

18. The wireless power transmission device of claim 17, wherein the at least one of the coils and the coil adjacent to the at least one of the coils of the plurality of coils include the third coil and the fourth coil, respectively, wherein at least the first shielding member is disposed in the conductive wire region of the third coil so as to at least partially overlap the opening region of the fourth coil, and wherein at least the second shielding member is disposed in the conductive wire region of the fourth coil so as to at least partially overlap the opening region of the third coil.

19. The wireless power transmission device of claim 18, wherein at least the first shielding member includes ferrite or nanocrystal having magnetic permeability of 1500 Wb/m2 or higher and 40000 Wb/m2 or lower.

* * * * *